(12) United States Patent
Cecil

(10) Patent No.: US 12,214,904 B1
(45) Date of Patent: Feb. 4, 2025

(54) AERIAL VEHICLE AUTONOMOUS ANCHORING AND POWERING

(71) Applicant: OVER, LLC, Durant, OK (US)

(72) Inventor: William O. Cecil, Durant, OK (US)

( * ) Notice: Subject to any disclaimer, the term of this patent is extended or adjusted under 35 U.S.C. 154(b) by 298 days.

(21) Appl. No.: 16/523,486

(22) Filed: Jul. 26, 2019

Related U.S. Application Data

(60) Provisional application No. 62/711,092, filed on Jul. 27, 2018.

(51) Int. Cl.
| | | |
|---|---|---|
| *B64F 1/12* | (2006.01) | |
| *B64C 19/00* | (2006.01) | |
| *B64C 29/00* | (2006.01) | |
| *B64F 1/36* | (2017.01) | |

(52) U.S. Cl.
CPC .............. *B64F 1/362* (2013.01); *B64C 19/00* (2013.01); *B64C 29/00* (2013.01); *B64F 1/12* (2013.01)

(58) Field of Classification Search
CPC .... B64F 1/12; B64F 1/125; B64F 1/14; B64F 1/364; B64C 2201/066; B64C 39/02; B64C 39/024
See application file for complete search history.

(56) References Cited

U.S. PATENT DOCUMENTS

| | | | | |
|---|---|---|---|---|
| 1,553,586 | A * | 9/1925 | Arnstein | B64F 1/14 244/110 G |
| 9,387,928 | B1 * | 7/2016 | Gentry | G08G 5/0052 |
| 2016/0039541 | A1 * | 2/2016 | Beardsley | G05D 1/042 701/2 |
| 2016/0039542 | A1 * | 2/2016 | Wang | B60L 53/53 244/114 R |
| 2016/0144982 | A1 * | 5/2016 | Sugumaran | A01D 41/12 244/108 |
| 2016/0347192 | A1 * | 12/2016 | Lee | B64C 39/024 |
| 2017/0021923 | A1 * | 1/2017 | Fisher | B64F 1/005 |
| 2017/0050533 | A1 * | 2/2017 | Wei | H01G 11/04 |
| 2017/0217323 | A1 * | 8/2017 | Antonini | B64F 1/007 |
| 2019/0043371 | A1 * | 2/2019 | Evan | G01S 5/0009 |
| 2019/0135433 | A1 * | 5/2019 | Goovaerts | B64C 39/024 |
| 2019/0344888 | A1 * | 11/2019 | Ben-David | G05D 1/101 |
| 2020/0017237 | A1 * | 1/2020 | Walker | B64D 45/04 |
| 2020/0255163 | A1 * | 8/2020 | Janssen | A47G 29/124 |
| 2020/0317340 | A1 * | 10/2020 | Gil | B64F 1/10 |

(Continued)

*Primary Examiner* — Joshua J Michener
*Assistant Examiner* — Colin Zohoori
(74) *Attorney, Agent, or Firm* — PAPALAS PLLC

(57) ABSTRACT

Apparatus and associated methodology contemplating AVAAP technology including (1) an "AV Assembly" which can be attached to the underside of a VTOL AV, and (2) the "Receiver Assembly" which can be attached to a Bollard Assembly installed in a Parking Pad. The two main assemblies, including their associated elements, components and parts, work together to automatically and autonomously anchor (secure) a VTOL AV to a Parking Pad just after landing, as well as automatically and autonomously un-anchor the AV from the Parking Pad just prior to take-off. Further, the two main assemblies of the claimed technology, to include their associated elements, components and parts, work together to automatically and autonomously connect electric grid power to a VTOL AV upon landing, and automatically and autonomously disconnect electric grid power from the AV upon take-off.

20 Claims, 14 Drawing Sheets

(56) References Cited

U.S. PATENT DOCUMENTS

2021/0229566 A1* 7/2021 Hao .................. B60L 53/68
2022/0134899 A1* 5/2022 Eide ................... B64F 1/12
                                              244/115

* cited by examiner

AERIAL VEHICLE AUTONOMOUS ANCHORING AND POWERING

RELATED APPLICATION

This application claims the benefit of the earlier filing date of U.S. Provisional Application No. 62/711,092, filed on Jul. 27, 2018.

SUMMARY

The claimed Aerial Vehicle Autonomous Anchoring and Powering (AVAAP) technology will automatically and autonomously anchor (secure) Vertical-Take-Off-and-Landing (VTOL) Aerial Vehicles (AVs) to Parking Pads (which include helipads and vertiports equipped with the technology) just after landing, as well as automatically and autonomously un-anchor the AVs just prior to take-off. Further, the claimed AVAAP technology will automatically and autonomously connect electric grid power to AVs upon landing, and automatically and autonomously disconnect electric grid power from AVs upon take-off. Parking Pads [400] may be at ground level or elevated on top of buildings/structures, and in future multi-story VTOL AV parking structures. The claimed AVAAP technology will anchor and power many types of VTOL AVs, including existing pilot-controlled helicopters/AVs, and future fully autonomous AVs. The AVs will transport cargo and/or human passengers.

The claimed AVAAP technology ensures that AVs do not move or blow off Parking Pads [400] in high winds or severe weather, enabling safe loading/unloading of cargo and/or passengers; reducing the risk of injury or death to occupants, ground crew, and nearby personnel; and reducing the risk of damage to nearby aircraft, infrastructure, equipment, and property at all times when anchored. The claimed technology will also eliminate the need to manually anchor and power AVs upon landing, and eliminate the need to manually un-anchor and de-power AVs prior to take-off.

The claimed AVAAP technology is comprised of two main assemblies: (1) the "AV Assembly" [100] which is attached to the underside of the AVs, and (2) the "Receiver Assembly" [200] which is attached to the Bollard Assembly [300], which is installed in Parking Pads [400]. The term "Parking Pads", as used herein, includes existing and future helipads and vertiports, some of which may be multi-story parking structures. As such, an AV consists of one part of the claimed technology (the AV Assembly) and a Parking Pad consist of the other part of the claimed technology (the Receiver Assembly). The AV Assembly can be installed on the bottom of new AVs, by AV manufacturers during the manufacturing process, or installed in existing AVs through retrofit. The Receiver Assembly can be installed in each Parking Pad upon construction, or added through renovation. The Receiver Assembly can be subsequently used by any AV equipped with the technology, when landing on the Parking Pad, regardless of manufacturer. The two main assemblies of the claimed technology work together to automatically and autonomously anchor and power any AV to any Parking Pad, maintain the anchored status and power connection while AVs are parked, and to un-anchor and disconnect electric grid power from AVs upon take-off.

BACKGROUND

The claimed AVAAP technology will overcome the problem of having to manually anchor and power a VTOL AV after landing. The claimed technology will enable AVs to be anchored securely and powered automatically and autonomously, without human assistance. The claimed technology is a significant improvement over manual anchoring systems and procedures currently used to anchor VTOL AVs to the ground. The claimed technology is also a significant improvement over manual powering systems and procedures currently used to power VTOL AVs on the ground.

Current systems typically use three or more tie-down straps, ropes or cables that are attached between the AV and ground anchors set in concrete. Typically, airports have only a limited number of parking spots with tie-down points, some on the tarmac and some in the grass, and many are reserved for local aircraft. If no parking spot with tie-down points is available, the typical alternative is for pilots or ground crew to install temporary pickets (steel stakes, helix coil, etc.) in the ground, if possible. In either case, the aircraft must be equipped with and carry around the appropriate number of straps, ropes or cables, and perhaps pickets, the weight of which detracts from available payload capacity. Further, upon parking, pilots or ground crew must manually attach the straps, ropes or cables to the aircraft and secure them to the tie-down points. These actions are inconvenient and time consuming, especially in severe weather. Because of the lack of parking spots with tie-downs and the inconvenience, some aircraft are temporarily parked and not secured at all, creating a potential hazard to people and property if high winds or severe weather occur.

The claimed technology provides an automatic and autonomous solution that eliminates the inconvenient and time-wasting manual work, and eliminates the necessity of carrying around weighty tie-down components (cargo straps, ropes or cables). The claimed technology will eliminate the following manual tasks:

Unloading tie-down straps/ropes/cables from aircraft
Strapping/tying down aircraft to ground anchors (typically three)
Obtaining and starting a Ground Power Unit (GPU)
Running a power cable from the GPU to the AV and plugging in power
Disconnecting the power cable from the AV
Disconnecting straps/ropes/cables from aircraft and anchors (typically three)
Repacking tie-down straps/ropes/cables into aircraft.

BRIEF DESCRIPTION OF THE DRAWINGS

Some embodiments of the claimed AVAAP technology are illustrated as an example and are not limited by the figures of the accompanying drawings, in which like references may indicated similar elements and in which:

DETAILED DESCRIPTION OF THE TECHNOLOGY

Figure 1:
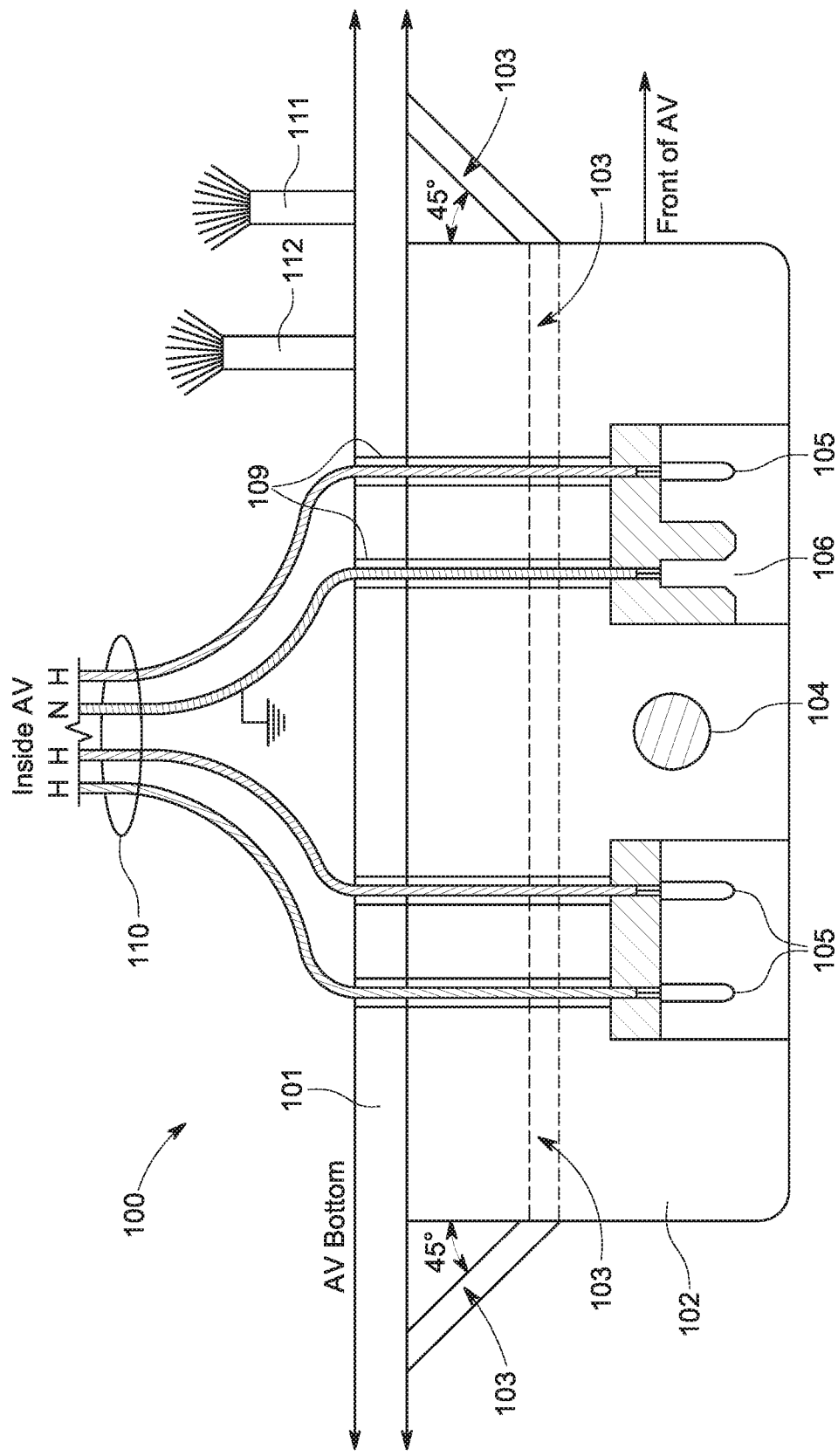
FIG. 1-FIG. 1 depicts a side view of the elements that may comprise an AVAAP, specifically the AV Assembly [100], according to various embodiments of the claimed technology.

The terminology used herein is for the purpose of describing particular embodiments only and is not intended to be limiting of the claimed technology. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprises" and/or "comprising", when used in this specification, specify the presence of stated features, steps, operations, assemblies, elements, components, and/or parts, but do not preclude the presence or addition of one or more other features, steps, operations, assemblies, elements, components, parts, and/or groups thereof.

Unless otherwise defined, all terms (including technical and scientific terms) used herein have the same meaning as commonly understood by one having ordinary skill in the art to which this claimed technology belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the claimed technology, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the claimed technology and the claims.

New anchoring and powering devices, apparatuses, and methods for anchoring and powering VTOL AVs to Parking Pads [400] are discussed herein. In the following description, for purpose of explanation, numerous specific details are set forth in order to provide a thorough understanding of the claimed technology. It will be evident, however, to one skilled in the art that the claimed technology may be practiced without these specific details.

In describing the claimed technology, the words "automatic" and/or "automatically" are used multiple times. As used herein, words "automatic" and/or "automatically" refer to actions/operations performed by the claimed technology as a result of the AVs software program commands, without human input or action. For example, the actions of anchoring the AV, un-anchoring the AV, connecting to electric grid power, and disconnecting from electric grid power are all described as "automatic".

In describing the claimed technology, the words "autonomous" and/or "autonomously" are used multiple times. As used herein, words "autonomous" and/or "autonomously" refer to actions/operations performed internally by the AV and/or claimed technology, without human interaction or assistance, and without input from any computer program, system or source, external to the AV itself. For example, the actions of anchoring the AV, un-anchoring the AV, connecting to electric grid power, and disconnecting from electric grid power are all described as "autonomous".

The present disclosure is to be considered as an exemplification of the claimed technology and is not intended to limit the claimed technology to the specific embodiments illustrated by the figures or description below.

The claimed AVAAP technology will now be described by referencing the appended figures representing preferred embodiments. In preferred embodiments, the AVAAP is configured with two main assemblies herein referred to as the AV Assembly [100] which can be mounted to the underside of the AVs as in the illustrative embodiments, and the Receiver Assembly [200] which can be mounted to the Bollard Assembly [300] as in the illustrative embodiments, which can be installed in Parking Pads [400].

FIG. 1-FIG. 1 depicts a cross-sectional side view of the elements that may comprise an AVAAP according to various embodiments of the claimed technology, specifically the AV Assembly [100] and its various components including the AV Mounting Plate [101], Anchor and Electric Plug [102], two Sloped Wedges [103], Hole for Dowel Pin [104], three Power Wire Pins [105], Power Wire Socket [106], four Holes for Power Wire [109], the AC Power Wires [110], Shielded Twisted Pair (STP) Cable for Video [111], and STP Cable for Power [112].

In preferred embodiments, the assembly is made of solid tungsten alloy material, with a chromium exterior coating, to provide superior strength and minimal drag. The Hole for Dowel Pin is the critical anchoring component, and as such is surrounded by ¾"×1½" solid tungsten alloy material to provide a lightweight but very strong anchor. The Dowel Pin (not shown) is extended through the Hole for Dowel Pin to anchor the entire AV, and then retracted to un-anchor the AV. The AC Power Wires, STP Cable for Video, and STP Cable for Power are illustrated being routed up into the AV itself through the AV's bottom. As the Receiver [201] (not shown) receives the Anchor and Electric Plug, connections are automatically and autonomously made between the Power Wire Pin [212] (not shown) in the Receiver and the Power Wire Socket [106] in the AV Assembly, and between three Power Wire Sockets [213] (not shown) in the Receiver and three Power Wire Pins [105] in the AV Assembly. There are no moving parts in the AV Assembly.

Figure 2:
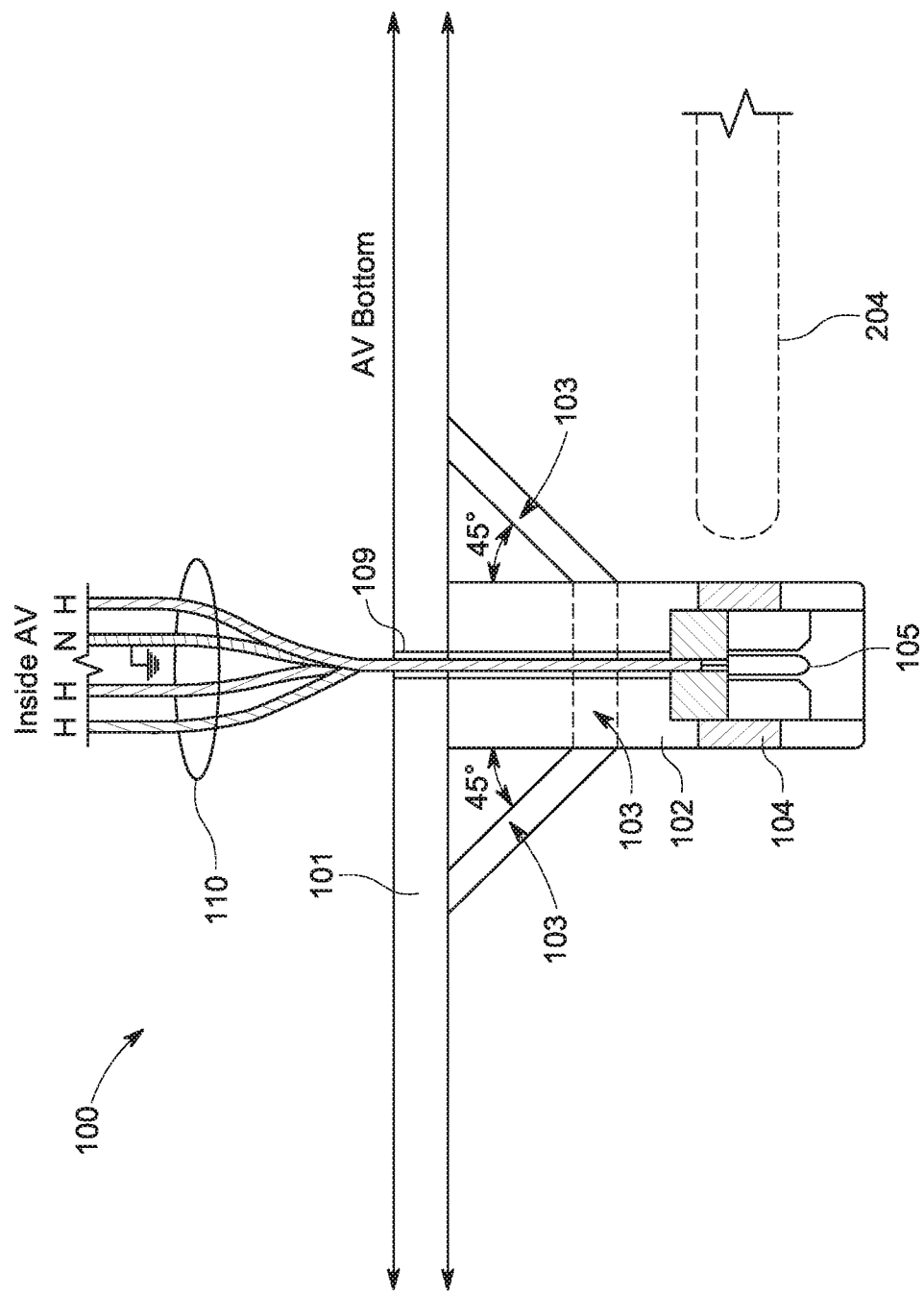
FIG. 2-FIG. 2 depicts a front view of the elements that may comprise an AVAAP, specifically the AV Assembly [100], according to various embodiments of the claimed technology.

FIG. 2-FIG. 2 depicts a cross-sectional front end view of the elements that may comprise an AVAAP according to various embodiments of the claimed technology, specifically the AV Assembly [100] and its various components including the AV Mounting Plate [101], Anchor and Electric Plug [102], two Sloped Wedges [103], Hole for Dowel Pin [104], one Power Wire Pin [105] on the front end, Hole for Power Wire [109], and AC Power Wires [110].

In preferred embodiments, the assembly is made of solid tungsten alloy material, with a chromium exterior coating, to provide superior strength and minimal drag. The Hole for Dowel Pin is the critical anchor component, and as such is surrounded by ¾"×1½" solid tungsten alloy material to provide a lightweight but very strong anchor. As evidenced by the end view perspective, the aerodynamic AV Assembly will have minimal effect on drag during flight. Although not part of the AV Assembly, the Dowel Pin [204] is represented by dashed lines, in its retracted position. It is extended through the Hole for Dowel Pin to anchor the entire AV, and then retracted to un-anchor the AV. The AC Power Wires are illustrated being routed up into the AV itself through the AV's bottom. The two other Power Wire Pins [105], Power Wire Socket [106], STP Cable for Video [111] and STP Cable for Power [112] are not shown and are not illustrated. There are no moving parts in the AV Assembly.

Figure 3:
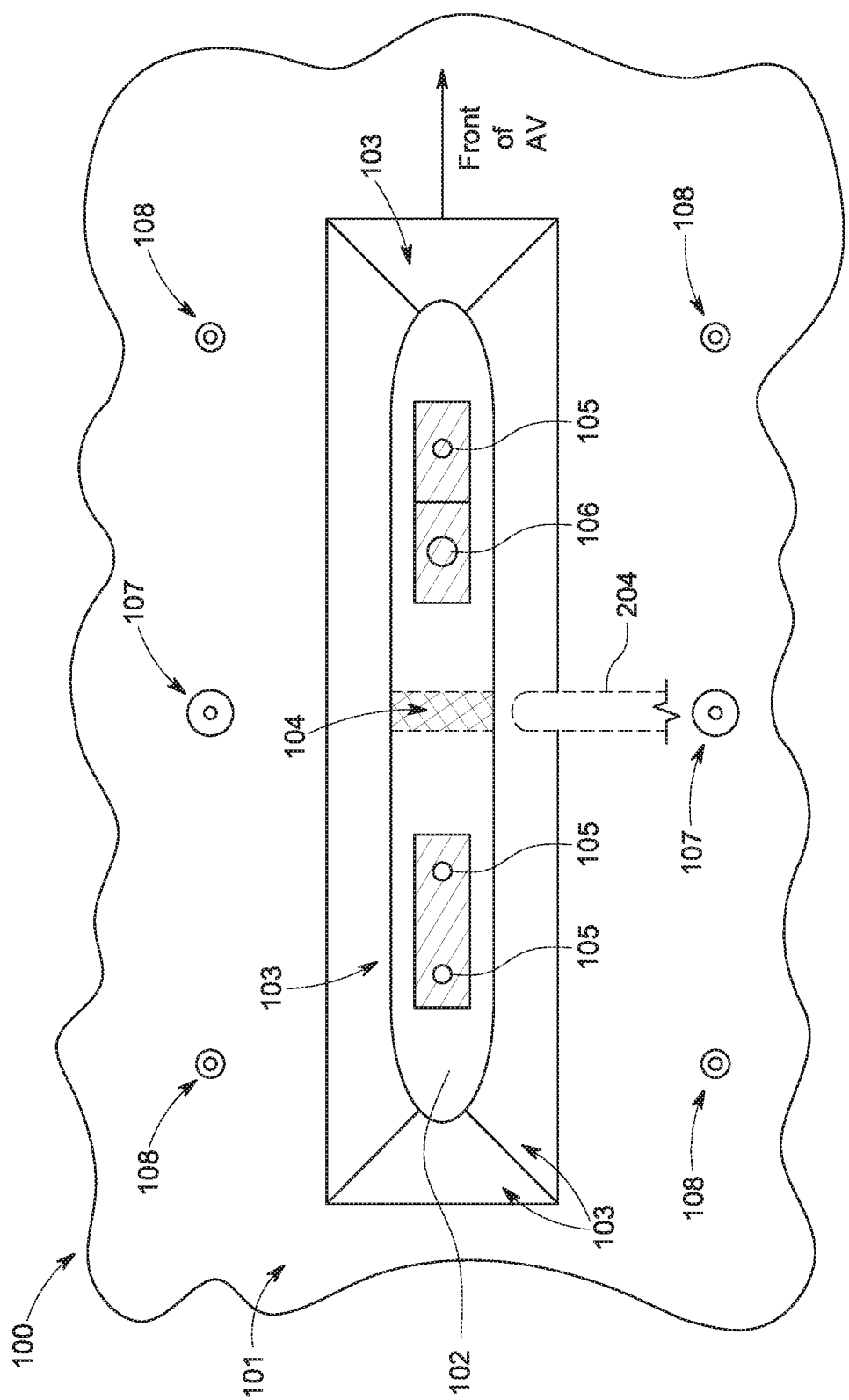
FIG. 3-FIG. 3 depicts a straight up view of the elements that may comprise an AVAAP, specifically the AV Assembly [100] when attached to an AV, according to various embodiments of the claimed technology.

FIG. 3—FIG. 3 depicts a straight up view of the elements that may comprise an AVAAP, when attached to the underside of an AV, according to various embodiments of the claimed technology, specifically the AV Assembly [100] and its various components to include the AV Mounting Plate [101], and a protuberant member that comprises an Anchor and Electric Plug [102], four Sloped Wedges [103], and an Anchor Hole for Dowel Pin [104], three Power Wire Pins [105], Power Wire Socket [106], two HD Cameras [107], and four LED Lights [108]. The four Sloped Wedges [103] have a trapezoidal cross-section along the axis with the front of the AV and a trapezoidal cross-section that is orthogonal to the axis with the front of the AV. The trapezoidal cross-section along the axis with the front of the AV is longer than the trapezoidal cross-section that is orthogonal to the axis with the front of the AV. The four Sloped Wedges [103] have an oblong rectangular cross-section that is orthogonal to both of the trapezoidal cross-sections.

The aerodynamic AV Assembly will have minimal effect on drag during flight. Although not part of the AV Assembly, the Dowel Pin [204] is represented by dashed lines, in its retracted position. It is extended through the Hole for Dowel Pin to anchor the entire AV, and then retracted to un-anchor the AV. FIG. 3 illustrates the position of the two HD Cameras and four LED Lights, mounted into the AV Mounting Plate, which is mounted to the underside of the AVs. The cameras and lights are provided DC power through the STP Cable for Power [112] (not shown), and the cameras provide video through the STP Cable for Video [111] (not shown) to either an existing touchscreen monitor [500] in the cockpit, an independent touchscreen monitor installed in the cockpit, or for autonomous AVs, to the Flight Control System (FCS) circuitry. Since there are many shapes and sizes of VTOL AVs, the shape and size of the AV Mounting Plate will be shaped and sized to match the particular shape and size of the AV year/make/model being manufactured or retrofitted. The custom shape and size ensure that the AV Mounting Plate Holes/Bolts [113] (not shown) are aligned with the AV's frame structure to ensure a strong, reliable connection. The custom design is then saved in CAD/CAM, and used to manufacture all future AV Assemblies for that year/make/model.

Figure 4:
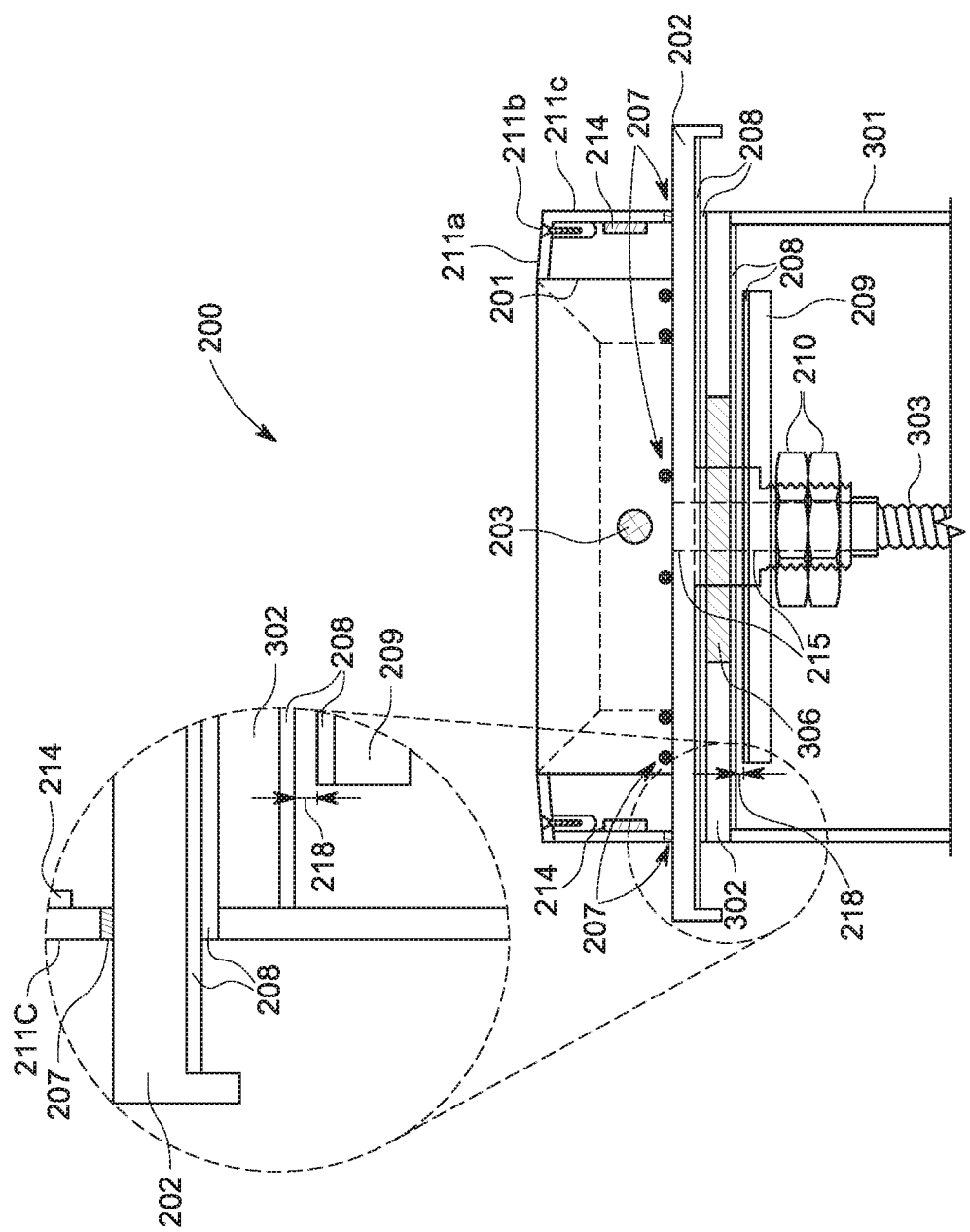
FIG. 4-FIG. 4 depicts a side view of the elements that may comprise an AVAAP, specifically the Receiver Assembly [200] centered on the top portion of the Bollard Assembly [300], according to various embodiments of the claimed technology.

FIG. 4-FIG. 4 depicts a cross-sectional side view of the elements that may comprise an AVAAP according to various embodiments of the claimed technology, specifically the Receiver Assembly [200] centered on the top portion of the Bollard Assembly [300], and their various components to include the Receiver [201], Receiver Mounting Plate [202], Hole for Dowel Pin [203], eight Weep Holes [207], four High Density Polyethylene (HDPE) Pads [208], Mounting Ring [209], two Nuts [210], Cover Top [211a], two Cover Top Screws [211b], Cover Side [211c], Heating Element [214], Hole for Power Wires [215] through the Receiver Mounting Plate, as well as the Bollard Tube [301], Bollard Mounting Plate [302], Flexible Electrical Metal Tubing (EMT) [303], and the Hole for Receiver Assembly Movement [306].

All of the Receiver Assembly's 200-series components will move/slide horizontally, as one assembly, within the confines of the Hole for Receiver Assembly Movement in the Bollard Mounting Plate, sliding in any horizontal direction up to its maximum limits, such as +/−1% inches from center in illustrative embodiments, when the Receiver Assembly is raised by the Bollard Assembly, and the Receiver Assembly's Sloped Wedges gently touch the bottom edge of the AV Assembly's Anchor and Electric Plug [102]. The sliding movement will align the Receiver directly under the AV Assembly's Anchor and Electric Plug, so as the Bollard Tube slowly extends upward, the Receiver will surround, engage and receive the Anchor and Electric Plug, effecting electrical connections between the pins and sockets.

The zoomed-in detailed illustration shows that the two upper HDPE pads are touching each other under normal conditions, which is the area of contact between the Receiver Assembly and the Bollard Assembly, allowing smooth and easy movement to enable proper alignment for anchoring and powering the AV.

The zoomed-in detailed illustration also shows that the two lower HDPE pads are not touching each other under normal conditions. The two lower pads only touch each other when the AV is being forced upwards and/or sideways by forces, such as wind, earthquake (particularly on top of tall buildings), ship movement, or otherwise. When the AV is being forced upwards and/or sideways, the AV Anchor and Electric Plug, Hole for Dowel Pin [104], Receiver, Receiver Mounting Plate [202], Hole for Dowel Pin [203], Dowel Pin [204], Mounting Ring [209], and two Nuts [210], work together to keep the AV in place. When that occurs, the two lower HDPE pads will allow the Receiver Assembly to slide smoothly and easily, up to its limits, such as +/−1½ inches from center in these illustrative embodiments, even though the Receiver Assembly and the stated components are being forced upwards and/or sideways.

Figure 5:
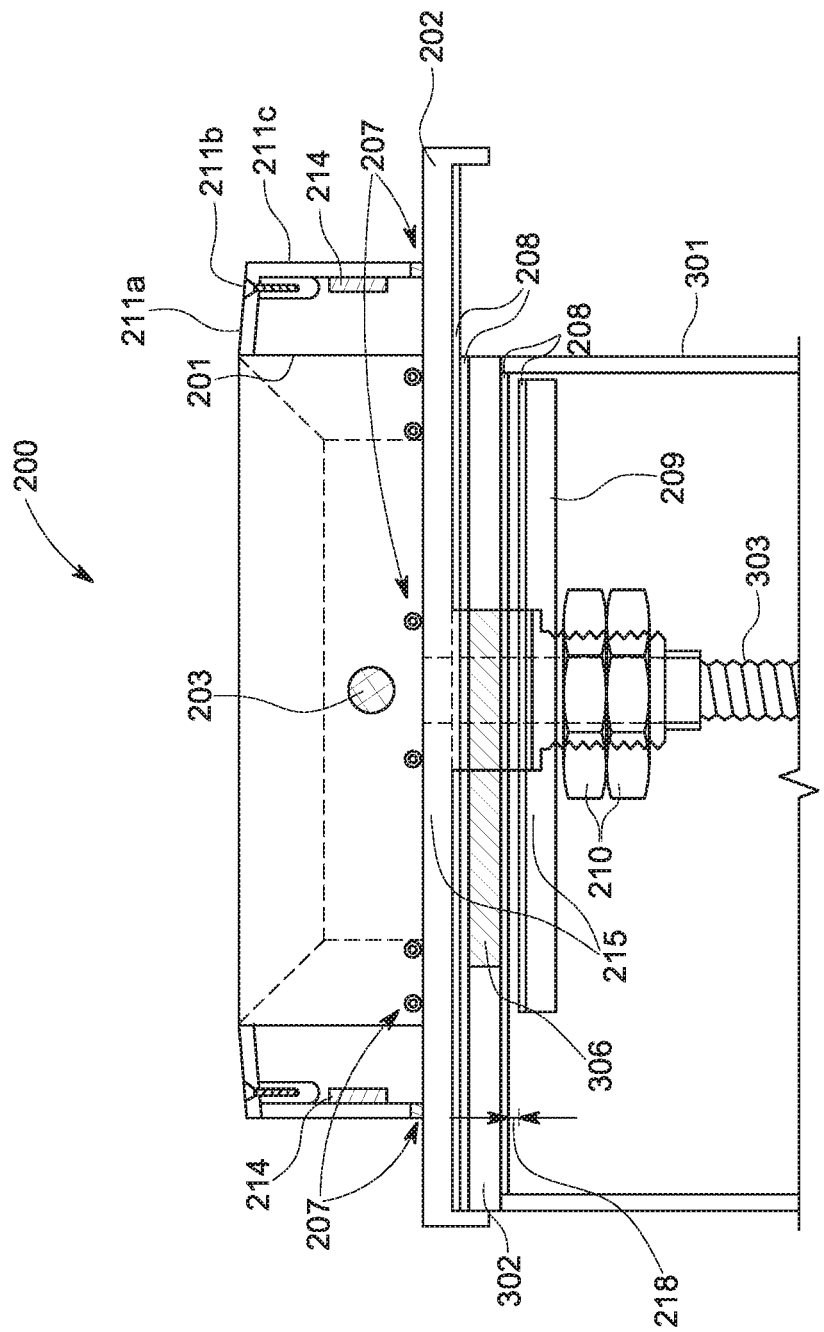
FIG. 5-FIG. 5 depicts a side view of the elements that may comprise an AVAAP, specifically the Receiver Assembly [200] slid to one side, on the top portion of the Bollard Assembly [300], according to various embodiments of the claimed technology.

FIG. 5-FIG. 5 depicts a side view of the elements that may comprise an AVAAP according to various embodiments of the claimed technology, specifically the Receiver Assembly [200] slid to one side, on the top portion of the Bollard Assembly [300], and their various components to include the Receiver [201], Receiver Mounting Plate [202], Hole for Dowel Pin [203], eight Weep Holes [207], four High Density Polyethylene (HDPE) Pads [208], Mounting Ring [209], two Nuts [210], Cover Top [211a], two Cover Top Screws [211b], Cover Side [211c], Heating Element [214], Hole for Power Wires [215] through the Receiver Mounting Plate, Bollard Tube [301], Bollard Mounting Plate [302], Flexible Electrical Metal Tubing (EMT) [303], and the Hole for Receiver Assembly Movement [306].

This view illustrates all of the Receiver Assembly's 200-series components slid horizontally over to one side, as one assembly, within the confines of the Hole for Receiver Assembly Movement in the Bollard Mounting Plate. The Receiver Assembly may slide in any horizontal direction up to its maximum limits, such as +/−1% inches from center in these illustrative embodiments. The sliding movement will align the Receiver directly under the AV Assembly's Anchor and Electric Plug, so as the Bollard Tube slowly extends upward, the Receiver will gently surround, engage and receive the Anchor and Electric Plug, effecting electrical connections between the pins and sockets.

Figure 6:
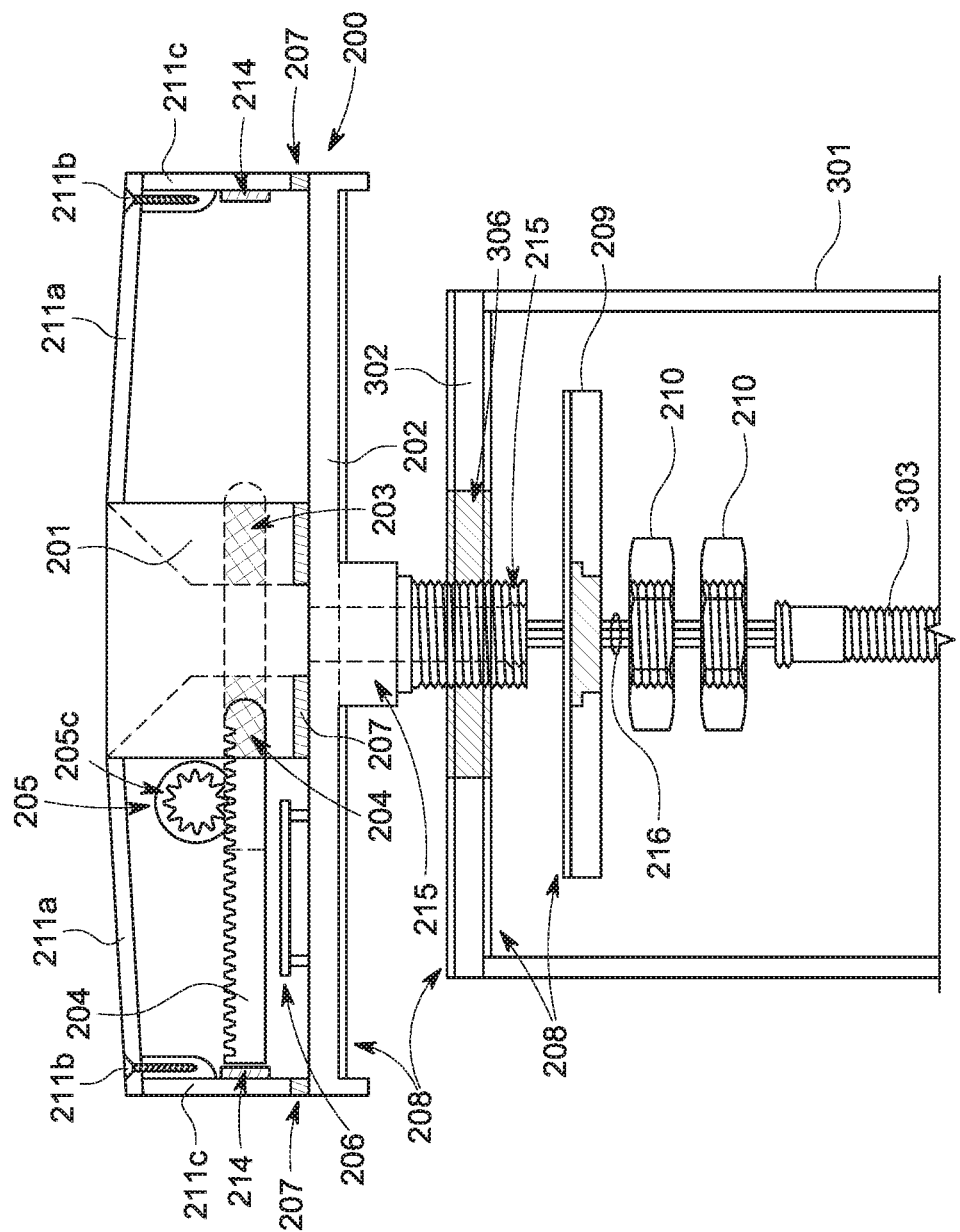
FIG. 6-FIG. 6 depicts an exploded side view of the elements that may comprise an AVAAP, specifically the Receiver Assembly [200], on the top portion of the Bollard Assembly [300], according to various embodiments of the claimed technology.

FIG. 6-FIG. 6 depicts an exploded, cross-sectional front end view of the elements that may comprise an AVAAP according to various embodiments of the claimed technology, specifically the Receiver Assembly [200] and the top portion of the Bollard Assembly [300], and their various components to include the Receiver [201], Receiver Mounting Plate [202], Hole for Dowel Pin [203], Dowel Pin [204], Electric Motor Assembly [205], Circuit Board [206], four Weep Holes [207], four High Density Polyethylene (HDPE) Pads [208], Mounting Ring [209], two Nuts [210], Cover Top [211a], two Cover Top Screws [211b], Cover Side [211c], Heating Element [214], Hole for Power Wires [215] through the Receiver Mounting Plate, Power Wires [216], Bollard Tube [301], Bollard Mounting Plate [302], Flexible Electrical Metal Tubing (EMT) [303], and the Hole for Receiver Assembly Movement [306].

The hole through the center of the Mounting Ring contains a "notch/stop" around the top of the hole, which when engaged around the lower tube/bolt portion of the Receiver Mounting Plate, stops the Mounting Ring from further movement towards the mounting plate. As the Nuts are torqued on, in these illustrative embodiments the notch/stop provides a ⅟₁₆" inch gap between the two lower HDPE Pads [208] sufficient to allow the Receiver Assembly to slide/ move easily and freely. The Electric Motor Assembly turns the Gear Box [205b] (not shown), which turns the Gear [205c] at a low RPM (e.g. approximately 1½ rotations per second), which either extends the Dowel Pin through the Dowel Pin Holes to anchor the AV in about one second, or retracts the Dowel Pin from the Dowel Pin Holes to un-anchor the AV in about one second, as required. The Dowel Pin is illustrated by solid lines in the retracted (un-anchored) position, and by dashed lines in the extended (anchored) position. The Heating Elements will heat the Receiver Assembly and its components when the temperature approaches the freezing point (about 35 degrees Fahrenheit) to melt ice, snow and/or sleet from building up on the Receiver Assembly. Water that enters the Receiver, from melting or rain, will weep out the Weep Holes surrounding the Receiver and Cover Side, without any negative effect to available electric power or AVAAP operation.

Figure 7:
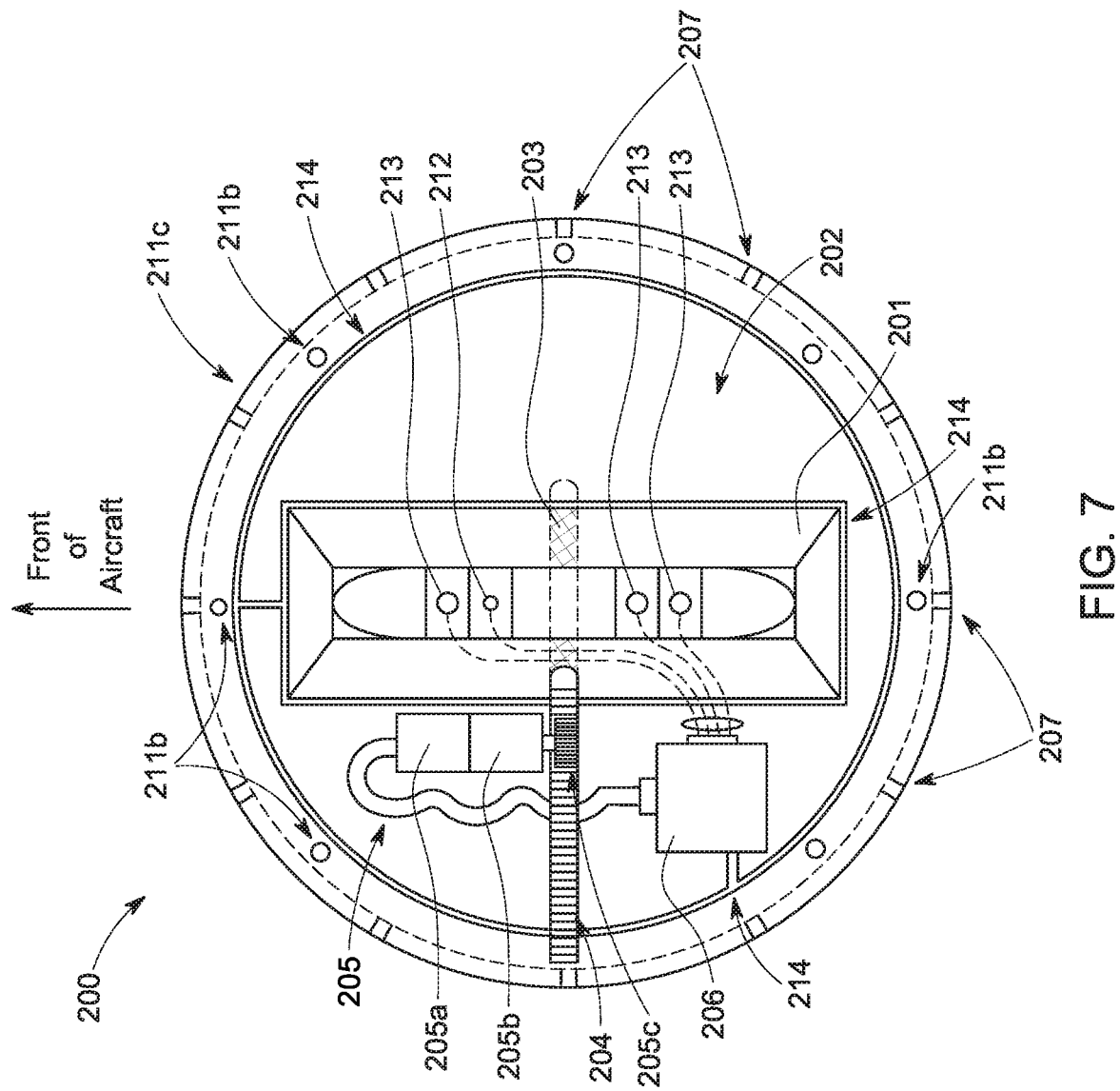
FIG. 7-FIG. 7 depicts a top down view of the elements that may comprise an AVAAP, specifically the Receiver Assembly [200], according to various embodiments of the claimed technology.

FIG. 7-FIG. 7 depicts a cross-sectional top down view of the elements that may comprise an AVAAP according to various embodiments of the claimed technology, specifically the Receiver Assembly [200] with the Cover Top [211a] removed, and various components to include the Receiver [201], Receiver Mounting Plate [202], Hole for Dowel Pin [203], Dowel Pin [204], Electric Motor Assembly [205], Electric Motor [205a], Gear Box [205b], Gear [205c], Circuit Board [206], 12 Weep Holes [207], seven Cover Top Screws [211b], Cover Side [211c], Power Wire Pin [212], three Power Wire Sockets [213], and the Heating Element [214].

The voltage, phase(s) and frequency of the power available to VTOL AVs at the Receiver Assembly [200] could be universal, standard values in preferred embodiments, or in other embodiments, varied according to the locally available supply power. The voltage can be stepped up/down and rectified/regulated within the AV, as required. Most commercial airports currently employ frequency converters to change the 50/60 Hz to 400 Hz, and most airports and GPUs provide aircraft with 115 VAC single-phase power at 400 Hz. If this power is used, only three of the four Power Wires [110, 216, 307] would be used (one hot, one neutral, and one ground). The Power Wire gauge, and pin/socket size is dependent upon the needed current. It is expected that the claimed AVAAP technology will consist of 2 AWG Power Wire and provide at least 60 amps of current, at 115 VAC. In other embodiments, 480/277 VAC, three-phase power could be provided to AVs, or a number of other three-phase voltages. If a three-phase solution is used, then all four of the Power Wires would be used (three hot wires and one neutral/ground), as illustrated in the Figures.

The position of the three Power Wire Sockets (hot phases) and one Power Wire Pin (neutral/ground) in the Receiver [210], as well as the position of the three Power Wire Pins (hot phases) and Power Wire Socket (neutral/ground) in the AV Assembly, ensures that the Receiver can only engage and receive the AV Assembly when properly aligned. The AV Assembly cannot be engaged and received into the Receiver if the AV has landed 180 degrees from the proper bearing, indicated by the Directional Arrow [402]. In this case, the Power Wire Sockets provide a "stop" function, keeping the Receiver and AV Assembly from fully engaging. The three Power Wire Sockets (hot phases) in the Receiver act like a "receptacle", ensuring that ground personnel cannot touch the hot phases and get electrocuted.

The Dowel Pin is illustrated by solid lines in the retracted (un-anchored) position, and by dashed lines in the extended (anchored) position. The Dowel Pin is actually a "round gear rack" having teeth along the top edge which are used by the Gear to extend or retract it, when the Circuit Board Control Circuitry (not shown) provides the proper voltage (e.g. +/−12 VDC). When the Electric Motor Assembly receives+ 12 VDC from the Control Circuitry, the Electric Motor turns the Gear Box, which turns the Gear clockwise at a low RPM (e.g. approximately 1½ rotations per second), which either extends the Dowel Pin through the Dowel Pin Holes to anchor the AV in about one second, or retracts the Dowel Pin from the Dowel Pin Holes to un-anchor the AV in about one second, as required. The Heating Element will heat the Receiver Assembly and its components when the temperature approaches the freezing point (−35 degrees Fahrenheit) to melt ice, snow and/or sleet from building up on the Receiver Assembly. Water that enters the Receiver, from melting or rain, will weep out the Weep Holes surrounding the Receiver and Cover Side, without any negative effect to available electric power or AVAAP operation.

Figure 8:
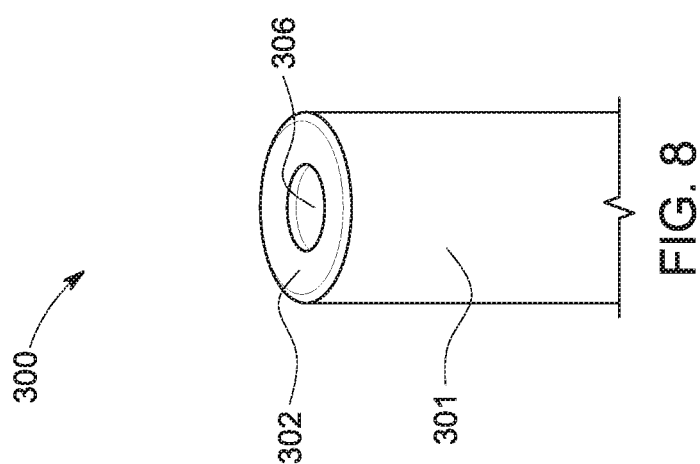
FIG. 8-FIG. 8 depicts a perspective 3-dimensional view of the elements that may comprise an AVAAP, specifically the upper portion of the Bollard Assembly [300], according to various embodiments of the claimed technology.

FIG. 8—FIG. 8 depicts a perspective 3-dimensional view of the elements that may comprise an AVAAP according to various embodiments of the claimed technology, specifically the upper portion of the Bollard Assembly [300] when extended, and its various components to include the Bollard Tube [301], Bollard Mounting Plate [302], and Hole for Receiver Assembly Movement [306]. The Receiver Assembly [200] (not shown) is mounted on top of the Bollard Mounting Plate, and slides horizontally when the interior sloped sides of the Receiver [201] (not shown) touch the bottom edge of the AV Anchor and Electric Plug [102] (not shown), in order to properly align the Receiver directly under the AV Assembly [100] (not shown). The Receiver Assembly slides smoothly and easily on the two upper HDPE Pads [208], within the confines of the Hole for Receiver Assembly Movement, up to the maximum limit, such as +/−1% inches from center.

Figure 9:
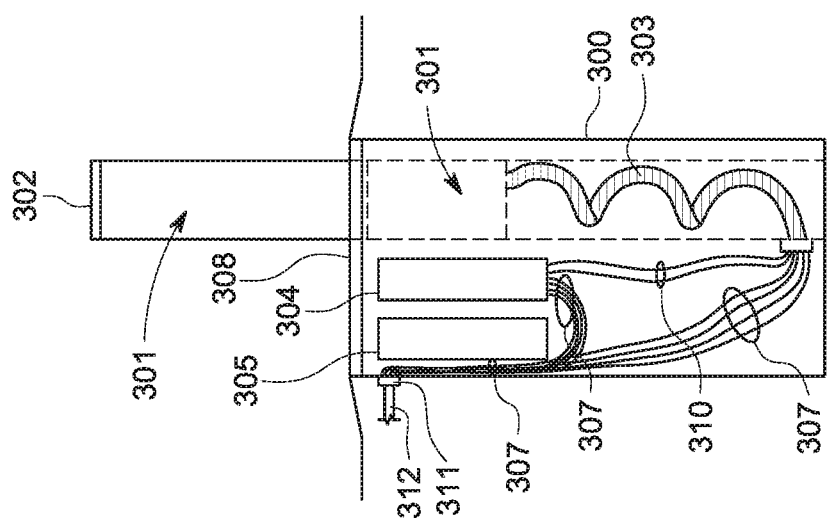
FIG. 9-FIG. 9 depicts a side view of the elements that may comprise an AVAAP, specifically the Bollard Assembly [300] when installed in a Parking Pad, according to various embodiments of the claimed technology.

FIG. 9—FIG. 9 depicts a cross-sectional side view of the elements that may comprise an AVAAP according to various embodiments of the claimed technology, specifically the Bollard Assembly [300] when installed in a Parking Pad, specifically the Bollard Assembly [300] and its various components to include the Bollard Tube [301], Bollard Mounting Plate [302], Flexible EMT [303], Electric Drive Motor [304], Counterbalance [305], Power Wires [307], Bollard Top Deck [308], Power Wires to Bollard Electric Drive Motor [310], EMT Junction Box [311], and Rigid EMT [312]. The Bollard Tube is depicted in the extended position, where the Flexible EMT is uncoiled. When the Bollard Tube is retracted, the Flexible EMT coils itself at the bottom of the Bollard Assembly, below the Bollard Tube.

After a VTOL AV lands, properly aligned with the Receiver [201] (not shown), within the maximum limit, such as +/−1% inches from center, the pilot or FCS shuts power OFF to the AV's electric motor/propeller systems, and transmits a Wi-Fi "POWER OFF" signal to the AVAAP Wi-Fi Circuitry [206b]. The Wi-Fi Circuitry forwards the "POWER OFF" signal to the Control Circuitry [206c], which then sends +12 VDC to the Bollard Electric Drive Motor [304], which causes the motor to rotate clockwise, which extends the Bollard Tube upward until the Receiver surrounds, engages and receives the Anchor and Electric Plug [102] (not shown), achieving the electrical connections between the pins and sockets (not shown). When the Receiver is fully seated around the Anchor and Electric Plug, and the resistance to further upward movement is detected (e.g. electric load to the motor increases because the motor is not able to spin at full speed), the Control Circuitry stops applying the +12 VDC to the Electric Drive Motor, stopping the motor rotation, which stops the upward movement of the Bollard Tube. Once stopped, the Control Circuitry applies+ 12 VDC to the Receiver's Electric Motor [205a] (not shown), which turns the Gear [205c] (not shown) to extend the Dowel Pin [204] (not shown) through the Holes for Dowel Pin [104 and 203] to anchor the AV.

When a VTOL AV is ready to depart (doors closed), the pilot or FCS applies power to the AV's electric motor/propeller systems, and transmits a Wi-Fi "POWER ON" signal to the AVAAP Wi-Fi Circuitry, which forwards the "POWER ON" signal to the Control Circuitry [206c]. The Control Circuitry then sends −12 VDC to the Receiver's Electric Motor [205a] (not shown). The Motor and Gear Box [205b] turn the Gear [205c] (not shown) to retract the Dowel Pin [204] (not shown) from the Holes for Dowel Pin [104 and 203], which un-anchors the AV. Once the AV is un-anchored, the Control Circuitry applies −12 VDC to the Bollard's Electric Drive Motor [304], causing it to rotate counterclockwise, which retracts the Bollard Tube [301] from the Anchor and Electric Plug [102] (not shown), and disconnects the electrical connections between the pins and sockets (not shown). The motor continues to retract the Bollard Tube until it is fully retracted back into the Bollard Assembly [300]. Once the Bollard Tube is fully retracted, the AV departs.

Figure 10:
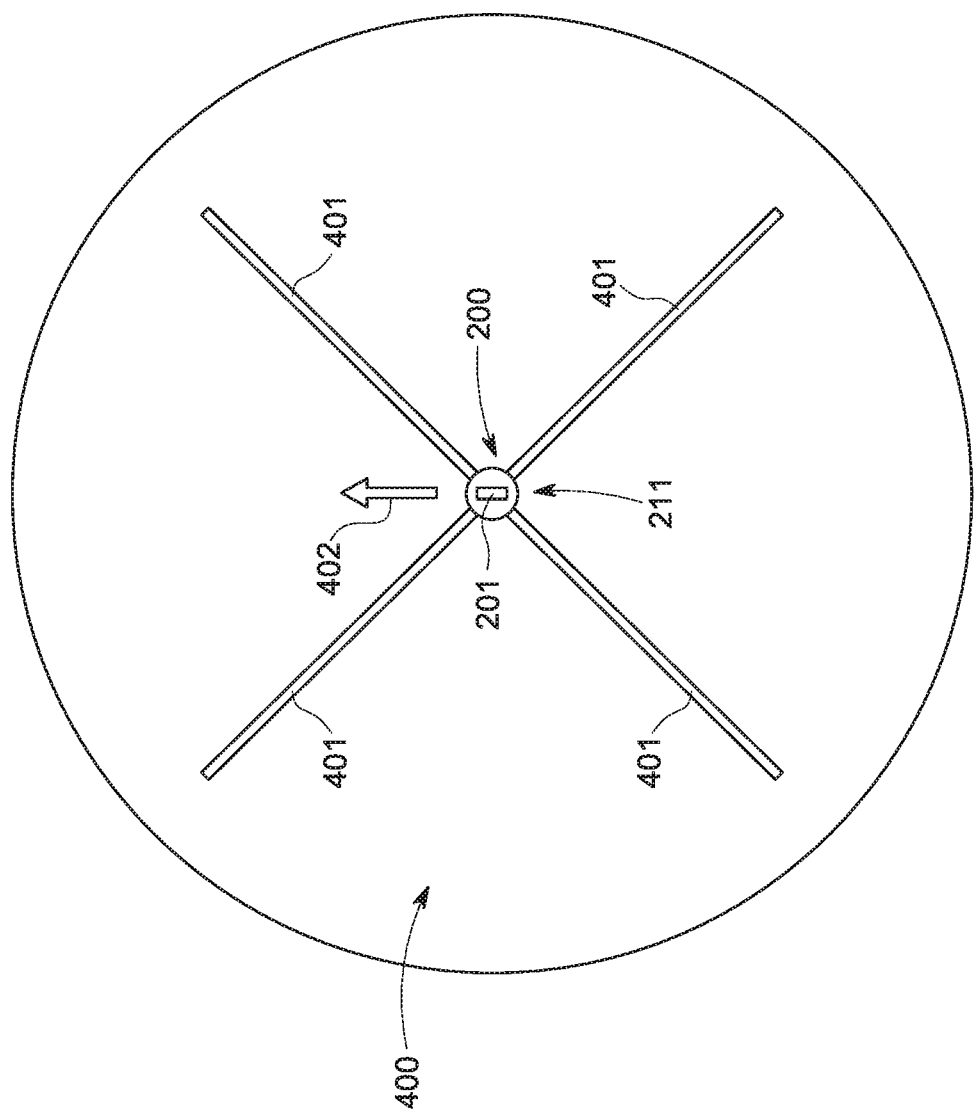
FIG. 10-FIG. 10 depicts a top down view of the elements that may comprise an AVAAP, specifically a Parking Pad [400] equipped with the technology, according to various embodiments of the claimed technology.

FIG. 10-FIG. 10 depicts a top down view of the elements that may comprise an AVAAP according to various embodiments of the claimed technology, specifically a Parking Pad [400] and its components, including four white, reflective Landing Stripes [401] one white, reflective Directional Arrow [402], as well as the Receiver Assembly [200], Receiver [201], and Cover [211]. The four Landing Stripes and the Directional Arrow are painted on the Parking Pad surface using white, thermoplastic paint containing microscopic glass beads, which provides reflective properties. The Directional Arrow indicates the direction that the front of the AV must align to when landing, so the electrical pins and sockets are properly positioned. If the AV lands in a reversed position (e.g. 180 degrees out) or in any other position, the Receiver Assembly [200] will not engage the AV Assembly, and it will not be anchored or powered. The Directional Arrow is used by the pilot, in a pilot-controlled helicopter/AV, to visualize the proper position/alignment of the AV when landing. The pilot adjusts the AV's yaw to orient the AV to the proper bearing, so it is properly aligned with the Directional Arrow and Receiver Assembly [200]. An autonomous AV's FCS performs these tasks autonomously. The four Landing Stripes are oriented based on the position of the Directional Arrow, and form an "X" shape with the Receiver Assembly [200] in the center. The "X" shape Landing Stripes are used by AV's equipped with cameras on the landing feet, so each landing foot can be aligned to land directly over its Landing Stripe. The Directional Arrow and the four Landing Stripes enable precise AV alignment and landing on the Parking Pad.

Figure 11:
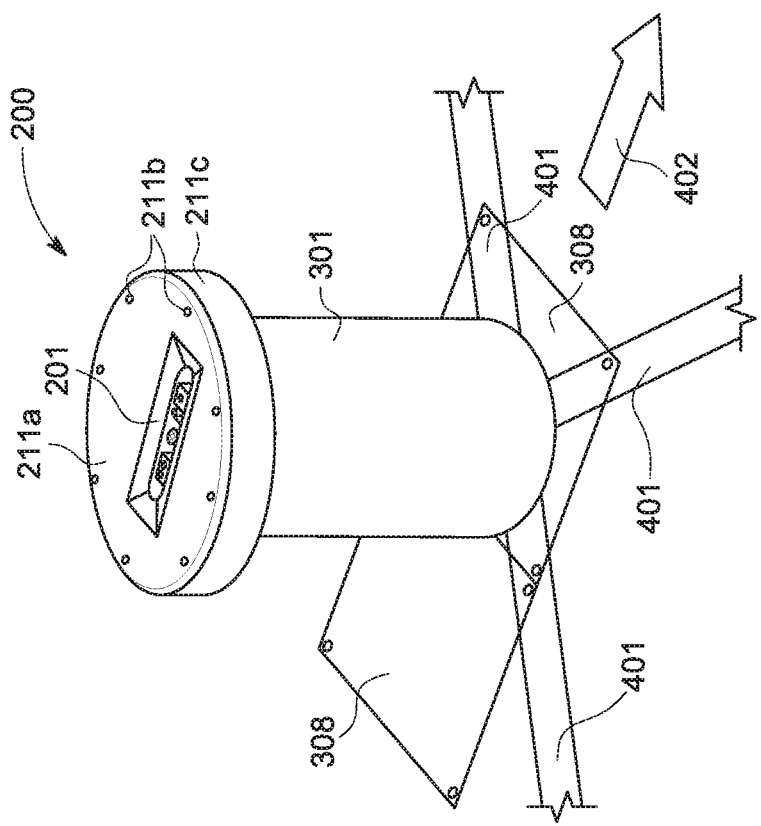
FIG. 11-FIG. 11 depicts a perspective view of the elements that may comprise an AVAAP, specifically the Receiver Assembly [200] mounted to the Bollard Assembly [300] installed in a Parking Pad [400], when the Bollard Tube [301] has been extended up, according to various embodiments of the claimed technology.

FIG. 11-FIG. 11 depicts a perspective view of the elements that may comprise an AVAAP according to various embodiments of the claimed technology, specifically the Receiver Assembly [200] connected to the Bollard Assembly [300] when extended. Various components include the Receiver [201], Cover Top [211a], Cover Top Screws [211b], Cover Side [211c], Bollard Tube [301], Bollard Top Deck [308], four Landing Stripes [401] forming an "X" shape, and the Directional Arrow [402]. The Cover Top and Side will be painted with a white, reflective thermoplastic paint containing microscopic glass beads which provides reflective properties. The Receiver [201] will be coated with chromium to provide a smooth, slick surface. Typically, in this position, the Receiver Assembly [200] is in-use, anchoring and powering an AV. In this position, maintenance personnel can access the internal components of the Bollard Assembly by removing both of the Bollard Top Decks.

Figure 12:
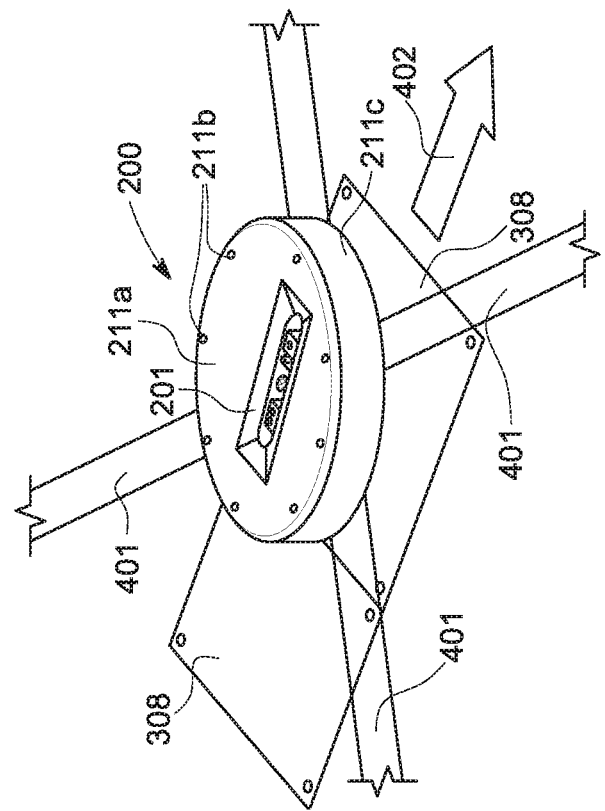
FIG. 12-FIG. 12 depicts a perspective view of the elements that may comprise an AVAAP, specifically the Receiver Assembly [200] mounted to the Bollard Assembly [300] installed in a Parking Pad [400], when the Bollard Tube [301] has been retracted, according to various embodiments of the claimed technology.

FIG. 12-FIG. 12 depicts a perspective view of the elements that may comprise an AVAAP according to various embodiments of the claimed technology, specifically the Receiver Assembly [200] mounted to the Bollard Assembly [300] installed in a Parking Pad [400], when the Bollard Tube [301] has been retracted. Various components include the Receiver [201], Cover Top [211a], Cover Top Screws [211b], Cover Side [211c], Bollard Top Deck [308], four Landing Stripes [401] forming an "X" shape, and the Directional Arrow [402]. Typically, in this position, the Receiver Assembly is not in-use because there is no AV to anchor and power, but the Wi-Fi Circuitry [206b] is always ON so it can auto-connect to an approaching AV.

Figure 13:
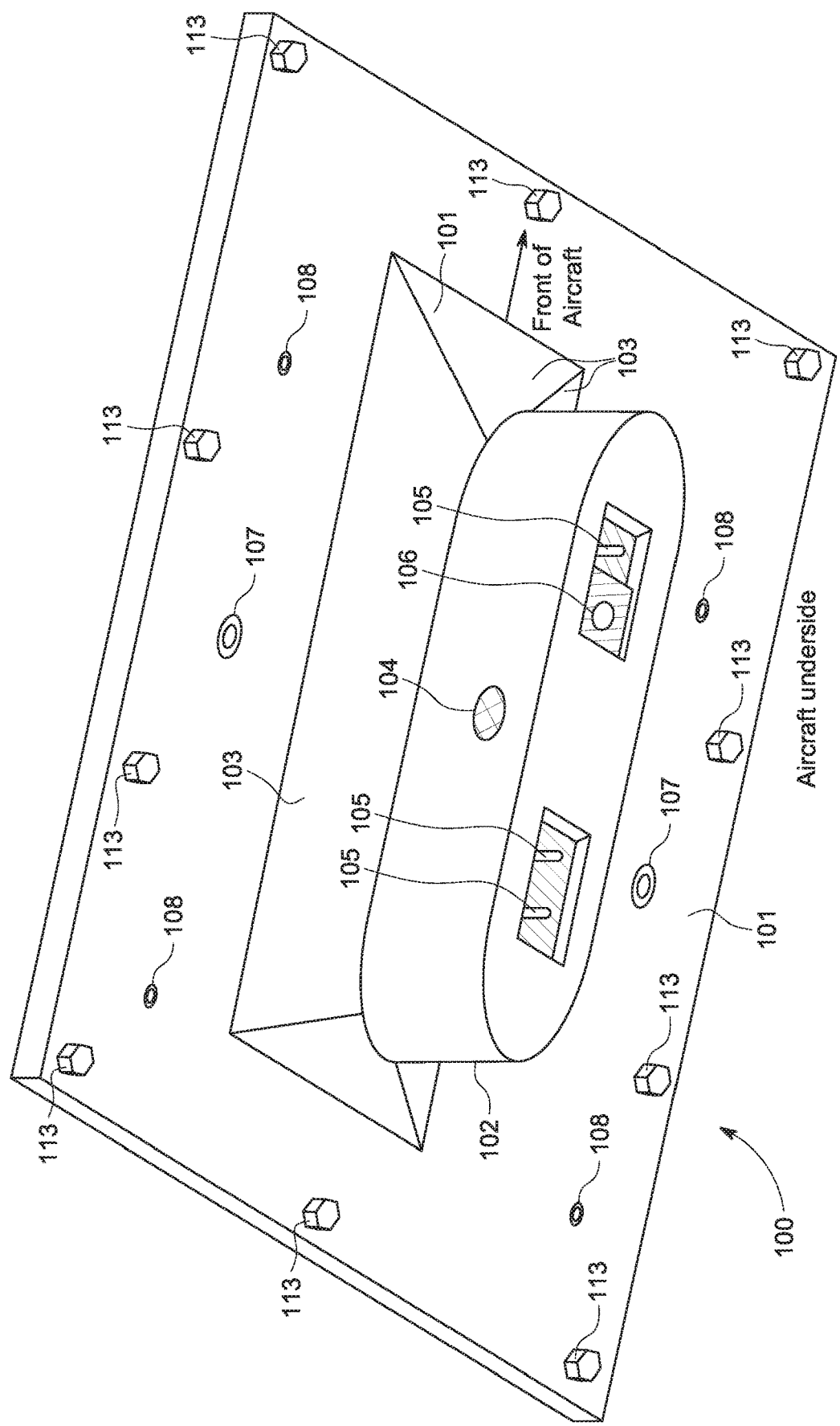
FIG. 13-FIG. 13 depicts a perspective view of the elements that may comprise an AVAAP, specifically the AV Assembly [100] when mounted to the underside of an AV, according to various embodiments of the claimed technology.

FIG. 13-FIG. 13 depicts a perspective view of the elements that may comprise an AVAAP according to various embodiments of the claimed technology, specifically the AV Assembly [100] when mounted to the underside of an AV. Various components include the AV Mounting Plate [101], Anchor and Electric Plug [102], four Sloped Wedges [103], Hole for Dowel Pin [104], three Power Wire Pins [105], Power Wire Socket [106], two High Definition (HD) Cameras [107], four LED Lights [108], and ten AV Mounting Plate Holes/Bolts [113].

Each AV Mounting Plate will be custom shaped and sized to match the particular shape and size of the AV year/make/model being manufactured or retrofitted, so the AV Mounting Plate Holes/Bolts are aligned with the AV frame structure to ensure a strong, reliable connection. The custom design is then saved in CAD/CAM and used to manufacture all future AV Assemblies for that year/make/model. The AV Mounting Plate will typically be painted to match the AV's underside paint color, but may be any color or be coated with chromium. The Anchor and Electric Plug [102] and four Sloped Wedges [103] will typically be coated with chromium to provide a smooth, slick surface. The lightweight, aerodynamic, chromium-coated assembly will have minimal effect on drag during flight, regardless of the particular AV year/make/model.

Figure 14:
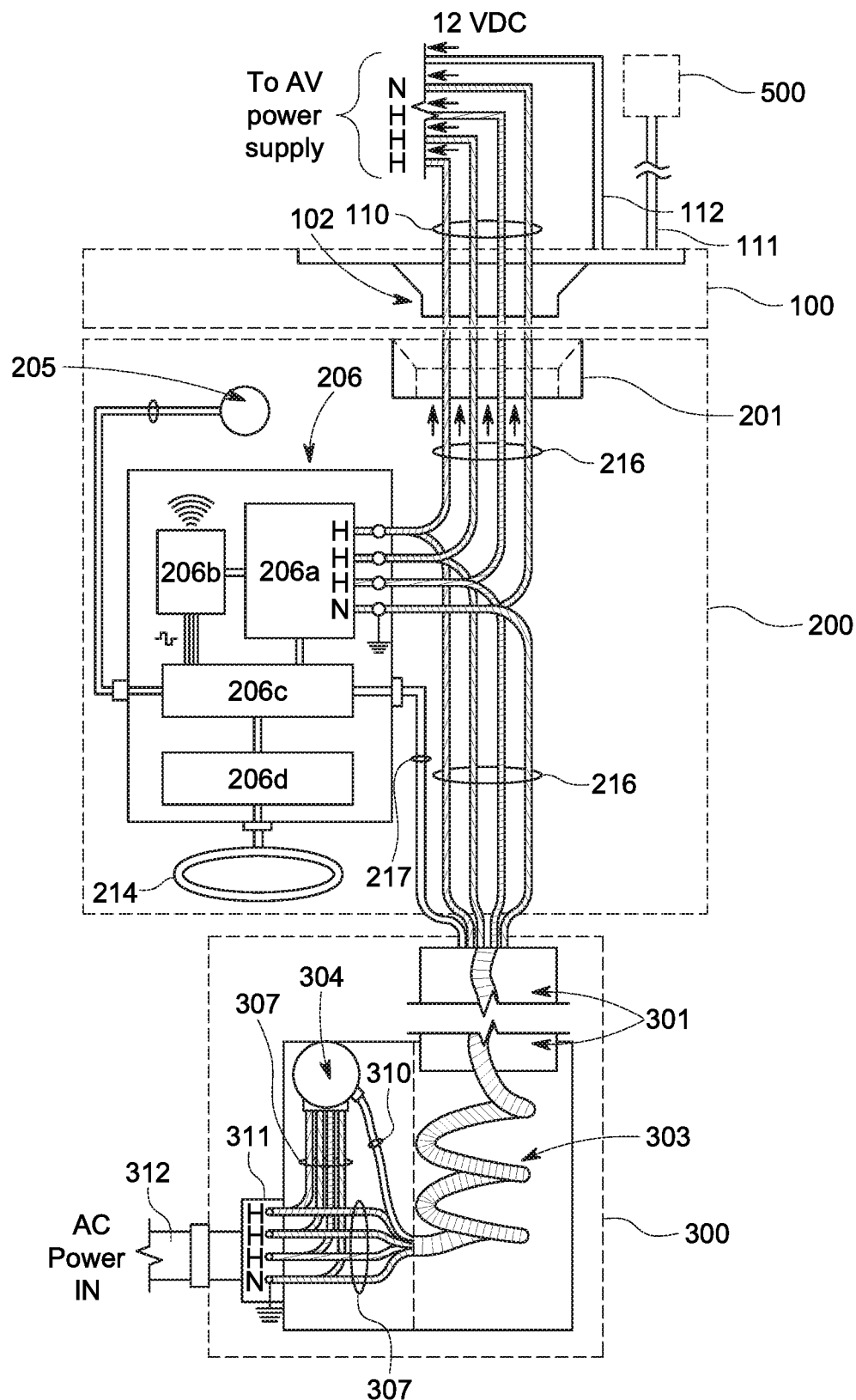
FIG. 14-FIG. 14 is an electrical block diagram of elements that may comprise an AVAAP, according to various embodiments of the claimed technology.

FIG. 14-FIG. 14 is an electrical block diagram of elements that may comprise an AVAAP according to various embodiments of the claimed technology. Components identified in the diagram include the AV Assembly [100], AV Mounting Plate [101], Anchor and Electric Plug [102], Sloped Wedges [103], four AC Power Wires [110], STP Cable for Video [111], STP Cable for Power [112], Receiver Assembly [200] Receiver [201], Circuit Board [206], Rectifier/Regulator Circuitry [206a], Wi-Fi Circuitry [206b], Control Circuitry [206c], Heating Element Thermostat Circuitry [206d], Heating Element [214], Power Wires [216], Power Wires to Bollard Electric Drive Motor [217], Bollard Assembly [300], Bollard Tube [301], Flexible EMT [303], Electric Drive Motor [304], Power Wires [307], Power Wires to Bollard Electric Drive Motor [310], EMT Junction Box [311], Rigid EMT [312], and either an existing touchscreen monitor [500] in the cockpit, an independent touchscreen monitor installed in the cockpit, or for autonomous AVs, the FCS circuitry, as appropriate.

The cable/wires for electric grid power enter the Bollard Assembly through Rigid EMT to the EMT Junction Box. The Power Wires [307] are mechanically connected to the input wires in the EMT Junction Box, and routed to the Bollard Electric Drive Motor [304], and through Flexible EMT [303] and the Bollard Tube [301] to connection points on the Circuit Board [206] in the Receiver Assembly [200], and then to the appropriate pins and sockets in the Receiver [102]. The preferred embodiment provides four Power Wires to accommodate three-phase power, specifically three wires for three hot phases, and one for neutral/ground. In other embodiments, the electric grid power may be single phase, where only three of the four wires would be used (e.g. one hot, one neutral, and one ground). The final power voltage, number of phases, frequency, amperage requirement, type of wire, and gauge of wire is TBD.

Once an AV has properly landed over the Receiver Assembly [200], and the pilot or AV's FCS shuts power OFF to the AV's electric motor/propeller systems, the AV transmits a "POWER OFF" signal over Wi-Fi. When the "POWER OFF" signal is received by the AVAAP Wi-Fi circuitry [206b] it is routed to the Control Circuitry [206c]. The Control Circuitry sends +12 VDC to the Bollard Electric Drive Motor [304], which causes the motor to rotate clockwise, which extends the Bollard Tube upward until the Receiver surrounds, engages and receives the Anchor and Electric Plug [102], achieving the electrical connections between the pins and sockets (not shown). The electric grid power is then routed to the AV's power supply, to be used as the AV manufacturer deems fit, up to the maximum amperage of the circuit. After the Receiver fully seats around the Anchor and Electric Plug, the Control Circuitry sends +12 VDC to the Receiver's Electric Motor Assembly [205], which causes the Gear [205c] to rotate clockwise, which moves the Dowel Pin [204] into the Holes for Dowel Pin [104 and 203] to anchor the AV.

The Circuit Board [206] contains Rectifier/Regulator Circuitry [206a] which rectifies the incoming AC voltage to DC, and regulates the +12 VDC, –12 VDC, and any other required output voltages. The Control Circuitry [206c] applies the proper DC voltages to the Receiver Electric Motor Assembly [205], Heating Element Thermostat Circuitry [205d], and the Bollard Electric Drive Motor [304], and determines when they will be applied and when they will be removed. The Heating Element [214] is turned on and off by the Heating Element Thermostat Circuitry [205d].

The AV Assembly receives 12 VDC power from the AV power supply through the STP Cable for Power [112], which powers the two HD Cameras [107] and four LED Lights [108] integrated in the AV Mounting Plate [101]. The HD Camera video feeds are routed to either an existing touchscreen monitor [500] in the cockpit, an independent touchscreen monitor installed in the cockpit, or for autonomous AVs, to the FCS circuitry. When an AV is ready to depart (doors closed), the pilot or FCS turns power ON to the AV's electric motor/propeller systems, and the AV transmits a "POWER ON" signal over Wi-Fi. When the "POWER ON" signal is received by the AVAAP Wi-Fi circuitry [206b] it is routed to the Control Circuitry [206c]. The Control Circuitry sends –12 VDC to the Receiver's Electric Motor Assembly [205], which causes the motor to rotate counterclockwise, which moves the Dowel Pin [204] out of the Holes for Dowel Pin [104 and 203] to un-anchor the AV. Afterwards, the Control Circuitry sends –12 VDC to the Bollard Electric Drive Motor [304], which causes it to rotate counterclockwise, which retracts the Bollard Tube and Receiver Assembly [200] from the AV Assembly, disconnecting the electrical connections between the pins and sockets (not shown). Once retracted, the AV takes off.

Figure 15:
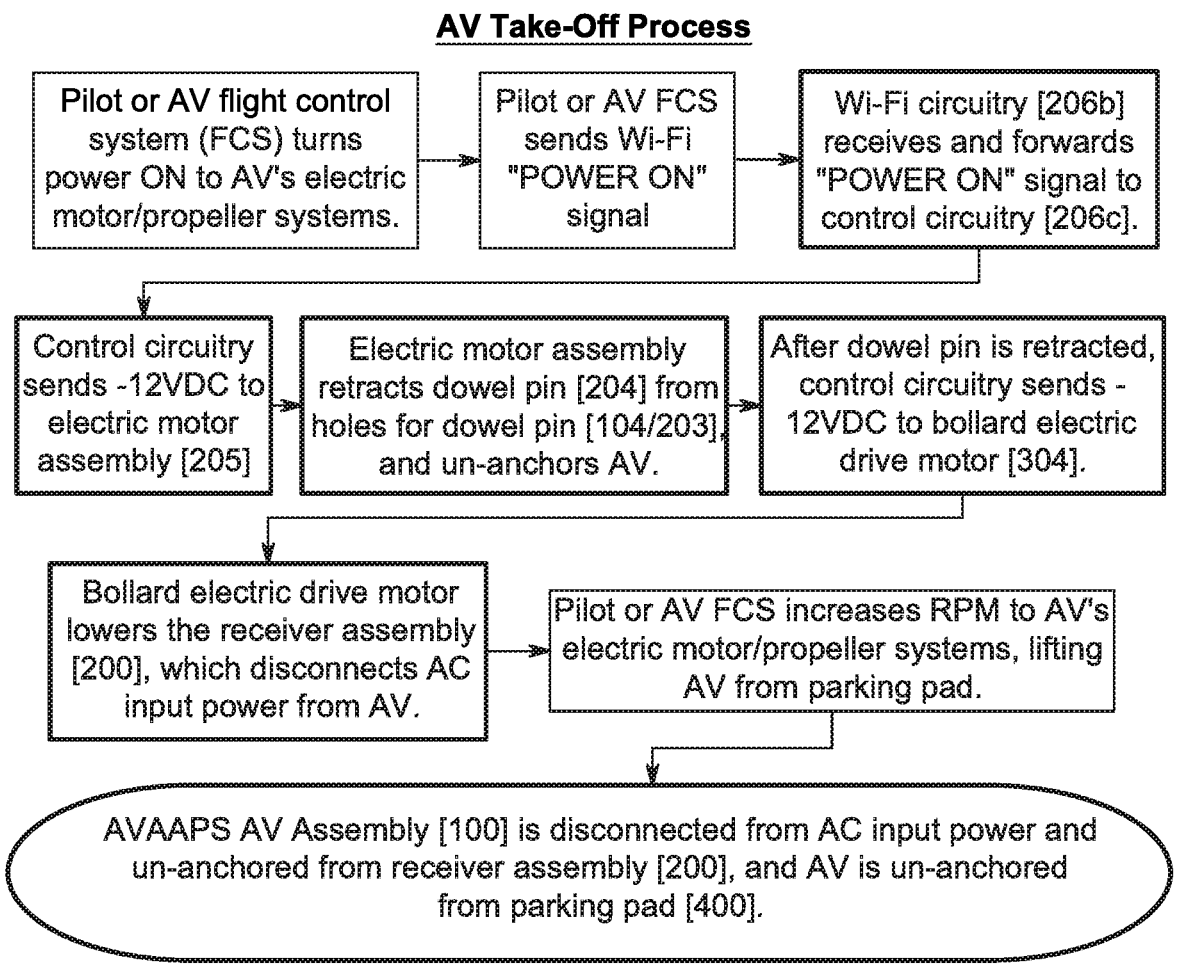
FIG. 15-FIG. 15 is a flowchart illustrating the VTOL AV take-off process, for both pilot-controlled and autonomous AVs, according to various embodiments of the claimed technology.

FIG. 15-FIG. 15 is a flowchart illustrating the VTOL AV take-off process, for both pilot-controlled and fully autonomous AVs, according to various embodiments of the claimed technology. The flowchart illustrates the overall AV take-off process, specifically actions performed by the pilot or the autonomous AV's FCS, and actions performed by the claimed AVAAP technology. Whenever the AV is within range of the AVAAP technology, the AV's Wi-Fi router connects, and remains connected, to the AVAAP Wi-Fi Circuitry [206b] within the Receiver Assembly [200]. This is the Wi-Fi "connected" status of an AV prior to beginning the take-off process.

When the AV is ready to depart (doors closed), the pilot or FCS turns power ON to the AV's electric motor/propeller systems. Once power is applied, the pilot sends a "POWER ON" Wi-Fi signal by touching the "POWER ON" icon on the touchscreen monitor [500]. An autonomous AV will send the "POWER ON" Wi-Fi signal autonomously. The "POWER ON" Wi-Fi signal is received by the AVAAP Wi-Fi Circuitry [206b], which forwards the "POWER ON" signal to the Control Circuitry [206c]. Once received, the Control Circuitry applies −12 VDC to the Electric Motor [205a], which rotates the Gear [205c] counterclockwise, and moves the Dowel Pin [204] out of the Holes for Dowel Pin [104/203] which un-anchors the AV.

After the Dowel Pin is retracted and the AV is un-anchored, the Control Circuitry sends −12 VDC to the Bollard Electric Drive Motor [304], which causes the motor to rotate counterclockwise, which retracts the Bollard Tube [301] and Receiver Assembly [200] from the AV Assembly [100]. As they retract, the electrical connections between the pins and sockets are automatically disconnected, which de-powers the AV from the electric grid power. The pilot or FCS then increases RPM to AV's electric motor/propeller systems, lifting the AV from the Parking Pad [400], and the AV takes off.

Figure 16:
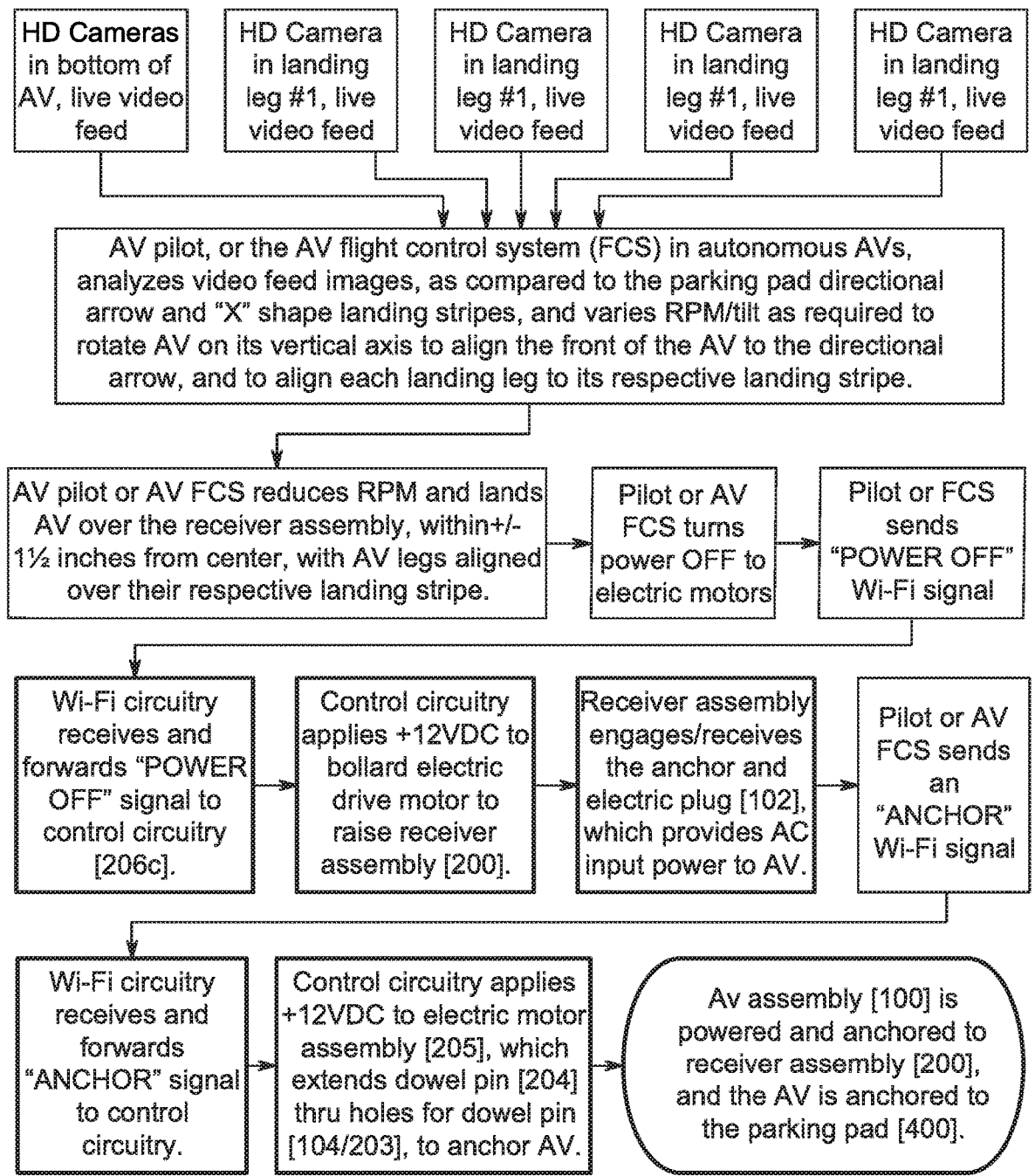
FIG. 16-FIG. 16 is a flowchart illustrating the VTOL AV landing process, for both pilot-controlled and autonomous AVs, according to various embodiments of the claimed technology.

FIG. 16-FIG. 16 is a flowchart illustrating the VTOL AV landing process for both pilot-controlled and fully autonomous AVs, according to various embodiments of the claimed technology. The flowchart illustrates the overall AV landing process, specifically actions performed by the pilot or the autonomous AV's FCS, and actions performed by the claimed AVAAP technology. As an AV approaches a Parking Pad [400], the AV's Wi-Fi router automatically and autonomously connects with the AVAAP Wi-Fi Circuitry [206b] within the Receiver Assembly [200]. Once connected to the AVAAP Wi-Fi Circuitry, the pilot or the FCS then turns power ON to the four LED Lights [108]. (Note: power to the two HD Cameras [107] is always ON). The two HD Cameras in the AV Assembly [100], and other cameras on the AV's landing legs (if so equipped), provide live video feeds to the cockpit or to the FCS. In a pilot-controlled AV, the video is integrated and displayed on an either an existing touchscreen monitor [500] in the cockpit, or an independent touchscreen monitor installed in the cockpit. For autonomous AVs, the video is routed to the FCS. As an AV descends towards a Parking Pad [400], the pilot manually rotates the AV on its vertical axis to the proper bearing, to align the AV's front to the Directional Arrow [402]. For autonomous AVs, the FCS executes computer program/code to rotate the AV on its vertical axis to the proper bearing, which aligns the AV's front to the Directional Arrow [402].

When a pilot-controlled AV descends towards the Receiver Assembly [200], the pilot analyzes the video feed images, and compares the position of the AV relative to the Directional Arrow [402] and the four X-shaped Alignment Stripes [401]. The pilot varies the RPM and/or tilt function of each electric motor/propeller system, to rotate the AV, as required, to maintain the AV's front alignment with the bearing of the Directional Arrow, and to align each landing leg over its respective Alignment Stripe, if so equipped, so the AV Assembly is directly over the Receiver. As the AV becomes properly aligned to the Receiver, within +/−1% inches from center, the touchscreen monitor [500] will indicate proper alignment in GREEN, or if not properly aligned in RED. The pilot reduces RPM, maintaining proper GREEN alignment, and lands the AV. If during landing, the AV lands with an unacceptable RED alignment, the pilot will increase RPM so to move the AV to the proper GREEN alignment position, and land once again. Once landed and properly aligned, the pilot turns power OFF to the electric motor/propeller systems.

When an autonomous AV descends towards the Receiver Assembly, the FCS analyzes the video feed images, and compares the position of the AV relative to the Directional Arrow and the four X-shaped Alignment Stripes. The FCS autonomously varies the RPM and/or tilt function of each electric motor/propeller system, to rotate the AV, as required, to maintain the AV's front alignment with the bearing of the Directional Arrow, and to align each landing leg over its respective Alignment Stripe, if so equipped, so the AV Assembly is directly over the Receiver. As the AV becomes properly aligned to the Receiver, within +/−1% inches from center, the FCS reduces RPM and lands the AV. If during landing, the AV lands with an unacceptable alignment, the FCS will increase RPM so to move the AV to the proper alignment position. Once properly aligned and landed, the FCS turns power OFF to the electric motor/propeller systems.

Once landed and the AV's electric motor/propeller systems are turned OFF, the pilot sends a "POWER OFF" Wi-Fi signal by touching the "POWER OFF" icon on the touchscreen monitor [500]. An autonomous AV will send the "POWER OFF" Wi-Fi signal autonomously. The "POWER OFF" Wi-Fi signal is received by the AVAAP Wi-Fi Circuitry [206b], which forwards the "POWER OFF" signal to the Control Circuitry [206c]. Once received, the Control Circuitry applies+12 VDC to Bollard Electric Drive Motor to raise the Receiver Assembly [200] so the Receiver [201] surrounds, engages and receives the Anchor and Electric Plug [102], achieving the electrical connections between the pins and sockets. When the Receiver is fully seated around the Anchor and Electric Plug, and the resistance to further upward movement is detected, the Control Circuitry stops applying the +12 VDC to the Electric Drive Motor, stopping the motor rotation, which stops the upward movement of the Bollard Tube.

Once the pilot detects that power has been applied to the AV, the pilot sends an "ANCHOR" Wi-Fi signal by touching the "ANCHOR" icon on the touchscreen monitor [500]. An autonomous AV detects that power has been applied to the AV, and automatically transmits the "ANCHOR" Wi-Fi signal. The "ANCHOR" Wi-Fi signal is received by the AVAAP Wi-Fi Circuitry, which forwards the "ANCHOR" signal to the Control Circuitry. Once received, the Control Circuitry applies+12 VDC to the Electric Motor [205a], which rotates the Gear [205c] clockwise, and moves the Dowel Pin [204] into the Holes for Dowel Pin [104/203] which anchors the AV. Once the AV is anchored, the pilot or FCS turns power OFF to the four LED Lights [108]. The result of the above actions is that the AV Assembly [100] is now anchored (secured) to the Receiver Assembly [200], and the AV is anchored (secured) to the Parking Pad [400].

In preferred embodiments, the AV Assembly [100] is constructed primarily of titanium alloy for its strength, superior corrosion resistance, and light weight. The Anchor and Electric Plug [102] and four Sloped Wedges [103] are coated with chromium, and the AV Mounting Plate [101] is painted to match the AV's color. The pins and sockets are made of copper, and are held in place by a hard, insulative material.

In other embodiments, the AV Assembly and/or its components may be constructed of other metals/alloys or other materials, may be attached to the underside of an AV using more or less bolts, may be attached to the underside of an AV using other connectors/methods, may be in a different position and/or location, may be integrated into the floor of the AV (as opposed to being mounted to the underside), may be a different size, either larger or smaller; may be a different shape, may have more or less cable/wires/pins/sockets, may have larger or smaller gauge wires, may have a larger or smaller Hole for Dowel Pin [104], and may have larger, smaller or no Sloped Wedges [103]. In other embodiments the anchoring feature may be accomplished using a different design, different method, and/or different components, in lieu of a straight Dowel Pin being inserted through Holes. Other embodiments include an inverted "T", ball, "U", hook, and disc shaped device which would accept an anchoring device from the Receiver Assembly, or other shapes and sizes of devices.

In other embodiments, the Receiver Assembly [200] and/or Bollard Assembly [300] may contain a device, system and/or process to return the Receiver Assembly to its centered position after an AV departs. Such a device, system and/or process may consist of an electrical coil or other device which generates electromagnetic forces all around the lower parts of the Receiver Assembly, which would be designed to repel the assembly from one side, and attract the assembly from the other side, in any required bearing/direction, and force it to slide back to the center position, ready for the next AV to arrive. In other embodiments the centering device, system and/or process may be accomplished using a different design, different method, and/or different components.

In other embodiments, the Receiver Assembly [200] and its components may be integrated into the top of the Bollard Tube [301] so the entire assembly can be retracted completely into the Bollard Assembly [300], where the Cover Top [211a] is level with the Bollard Top Deck [308]. These embodiments eliminate the Receiver Assembly from protruding up from the Parking Pad [400] surface (e.g. approximately 4½ inches); reduce the risk of being damaged by snowplows, vehicles, or other objects; and provide an unobstructed Parking Pad.

In other embodiments, instead of the Bollard Tube [301] being a solid tube, it could consist of multiple cylinder-shaped discs, each approximately 4 inches high and the same diameter as the Bollard Tube, connected together and stacked vertically, where each disc slides horizontally, in a manner similar to how the Receiver Assembly slides on the Bollard Tube, providing an overall greater alignment tolerance for AVs during the landing process. These embodiments would contain two HD Cameras and four LED Lights in the Receiver Assembly, positioned upwards toward the AV, which provide video feeds to the Control Circuitry, which then moves each disc independently to align the Receiver under the AV Assembly. These embodiments would move each disc using electromagnetic coils which generates independent electromagnetic forces affecting each respective cylinder-shaped disc, which would be designed to repel its respective disc from one side, and attract the disc from the other side, and force it to slide in any horizontal direction. The combined, cumulative amount of movement of all cylinder-shaped discs, produces a larger "GREEN" landing tolerance for AVs (e.g. +/−12 inches from the center position). In other embodiments the centering devices, systems and/or processes may be accomplished using different designs, different methods, and/or different components.

In other embodiments, instead of a Bollard Tube [301], the movement function could be provided by a strong, fully articulating robotic arm. Using HD Camera video feeds and LED Lights for illumination, the Control Circuitry [206c] would move the robotic arm to position the Receiver Assembly [200] under the AV Assembly [100]. After an AV departs, the robotic arm and Receiver Assembly would be fully retracted into the Bollard Assembly [300], where the Cover Top [211a] is level with the Bollard Top Deck [308]. These embodiments would also eliminate the Receiver Assembly from protruding up from the Parking Pad [400] surface, provide an unobstructed Parking Pad, and reduce the risk of being damaged by snowplows, vehicles, or other objects.

In preferred embodiments, the Receiver Assembly [200] is constructed primarily of hardened steel. The internal sloped walls within the Receiver are coated with chromium, and the Cover Top [211a] and Cover Side [211c] are painted with white, thermoplastic paint containing microscopic glass beads, which provides reflective properties. The pins and sockets are made of copper, and are held in place by a hard, insulative material.

In other embodiments, the Receiver Assembly [200] and/or its components may be constructed of other metals/alloys or other materials, may be attached to the Bollard Mounting Plate [302] using other connectors/methods, may provide the sliding feature using other methods, may align to the AV Assembly using other methods, may provide a greater alignment tolerance (e.g. >1½ inches), may displace water using other methods, may be larger, smaller, or a different shape; may have more or less cable/wires/pins/sockets, may have larger or smaller cable/wires/pins/sockets, may have a larger or smaller Dowel Pin [204], may have a different type, size, and/or shape of Dowel Pin [204], may have a larger or smaller Hole for Dowel Pin [203], may have larger, smaller or no sloped interior walls; may have a different type, shape, and/or size of assembly to move the Dowel Pin or other type of Dowel Pin; may have a different type, shape and/or size of Heating Element [214]; and the Heating Element may be attached in a different manner or position.

In other embodiments the anchoring feature may be accomplished using a different design, different method, and/or different components, in lieu of a straight Dowel Pin [104] being inserted through Holes. Other embodiments include other anchoring devices and/or methods to connect to an inverted "T", ball, "U", hook, or disc shaped device in the AV Assembly [100], and/or other shapes and/or sizes of devices.

In preferred embodiments, the Bollard Assembly [300] will be a modified Commercial-Off-The-Shelf (COTS) product manufactured by Nasatka Security, Clinton, MD. In other embodiments, the Bollard Assembly may be manufactured by Apex Fabrication and Design, Boyertown, PA, other manufactures, or by OVER, LLC itself. In other embodiments the Bollard Assembly may be a different design, shape, size, or strength. In other embodiments the Bollard Tube [301] may be a different length or diameter, and may extend upward more or less. In other embodiments the Electric Drive Motor may be replaced with a hydraulic or pneumatic drive.

In preferred embodiments, the Parking Pad [400] consists of four white, reflective Landing Stripes [401] in the shape of an "X", and one white, reflective Directional Arrow [402], both 2 inches wide. They are painted on the Parking Pad with white, thermoplastic paint containing microscopic glass beads, which provides reflective properties. In other embodiments, the Landing Stripes [401] and Directional Arrow [402] may be white, reflective adhesive decals, and may be adhered to the Parking Pad with adhesive. Further, the "X" shape and arrow designs may be changed to other designs/shapes.

In preferred embodiments, the Touchscreen Monitor [500] for a pilot-controlled AV is an existing device permanently installed in the cockpit. The device would be capable of receiving and displaying HD video during a landing event. In other embodiments, the touchscreen monitor would be a newly installed, independent device installed in the cockpit. For autonomous AVs, the HD video is routed to the FCS, and no touchscreen monitor is required.

While preferred materials for elements of the claimed AVAAP technology have been described, the claimed technology is not limited by these materials. Wood, plastics, rubber, foam, metal alloys, aluminum, titanium, carbon fiber, carbon composites, and other materials and/or composites may comprise some or all of the elements of the claimed technology.

Although the claimed AVAAP technology has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the claimed technology, are contemplated thereby, and are intended to be covered by the following claims.

What is claimed is:

1. An apparatus for automatically and autonomously anchoring Vertical-Take-Off-and-Landing (VTOL) Aerial Vehicles (AVs) to a parking pad after landing, and automatically and autonomously un-anchoring VTOL AVs from the parking pad prior to take-off, comprising:
   a protuberant member connected to an underside of an AV—that comprises four wedges and an anchor hole, wherein a first cross-section of the four wedges forms a trapezoid, and a second cross-section orthogonal to the first cross-section forms another trapezoid, wherein the first cross-section is longer than the second cross-section, wherein the anchor hole has a cross-section that is a complete circle, and the anchor hole extends completely through the protuberant member;
   a receptacle member connected to an upper surface of the parking pad, defining an anchor receiver, sized to engage and receive the four wedges and the anchor hole of the protuberant member; and
   a locking member within the receptacle member, configured to selectively engage the anchor hole of the protuberant member to prevent separation of the protuberant member from the receptacle member;
   wherein the four wedges and the anchor hole of the protuberant member are surrounded by and fully enclosed within the receptacle member when the locking member is engaged with the protuberant member;
   wherein the protuberant member has a third cross-section that is orthogonal to both the first and second cross-sections, and the third cross-section forms an oblong rectangle; and
   wherein the locking member passes through one side of the protuberant member and out the opposite side of the protuberant member via the anchor hole.

2. The apparatus of claim 1, wherein the locking member is a moveable pin which moves from a retracted position during flight of the AV to an engaged position after landing of the AV by passing through a corresponding hole in the receptacle member.

3. The apparatus of claim 1, wherein the receptacle member includes a plurality of sloped wedges which are operative to align the four wedges of the protuberant member with the receptacle member.

4. The apparatus of claim 1, wherein the protuberate member consists of fixed elements.

5. The apparatus of claim 1, further comprising:
   a bollard member that moves the receptacle member between a retracted position prior to takeoff of the AV and an extended position after landing of the AV.

6. The apparatus of claim 5, wherein the apparatus further comprises:
   at least one set of two High Density Polyethylene (HDPE) Pads, with one HDPE pad being fixed to a lower surface of the receptacle member and the other HDPE pad being fixed to an upper surface of the bollard member, wherein the two HDPE pads provide alignment of the protuberant member and the receptacle member.

7. The apparatus of claim 6, wherein the apparatus further comprises:
   a second set of HDPE pads, wherein the second set of HDPE pads allow the receptacle member to move in a limited manner while preventing separation of the protuberant member from the receptacle member when one of the AV and the parking pad is exposed to a force.

8. The apparatus of claim 1, wherein the receptacle member comprises:
   a heating element to remove solid water from the receptacle member.

9. The apparatus of claim 1, wherein the receptacle member comprises:
   at least one power coupling between the protuberant member and the receptacle member to provide power to the AV while the AV is anchored to the parking pad.

10. The apparatus of claim 1, wherein a portion of the protuberant member is comprised of at least one of:
    a tungsten alloy material, a titanium alloy, metal alloy, a carbon fiber, a carbon composite, and aluminum.

11. The apparatus of claim 1, wherein a portion of the protuberant member has a chromium exterior coating.

12. The apparatus of claim 1, wherein the apparatus operates to anchor the AV to a parking pad immediately after landing, and operates to un-anchor the AV from the parking pad immediately prior to take-off.

13. The apparatus of claim 1, wherein the AV is carrying at least one passenger.

14. The apparatus of claim 1, wherein the parking pad comprises a plurality of landing stripes to indicate proper positioning of the AV for the protuberant member to align with the receptacle member.

15. The apparatus of claim 1, wherein the protuberant member is aerodynamic to have a minimal effect on drag during flight of the AV.

16. The apparatus of claim 1, wherein the protuberant member comprises at least one camera and at least one light source for landing the AV.

17. The apparatus of claim 1, wherein the parking pad is a helipad.

18. The apparatus of claim 1, wherein the protuberant member is a solid member.

19. The apparatus of claim 1, wherein the AV is carrying cargo.

20. The apparatus of claim 1, wherein a portion of the receptacle member is comprised of at least one of:
  steel, aluminum, titanium, carbon fiber, a carbon composite, and a metal alloy.

* * * * *